US012273202B2

(12) United States Patent
Elshafie et al.

(10) Patent No.: US 12,273,202 B2
(45) Date of Patent: Apr. 8, 2025

(54) RESOURCE OCCASION REPETITION IN WIRELESS COMMUNICATIONS SYSTEMS

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/852,178

(22) Filed: Jun. 28, 2022

(65) Prior Publication Data
US 2023/0421303 A1 Dec. 28, 2023

(51) Int. Cl.
H04W 24/10 (2009.01)
H04L 1/1812 (2023.01)
H04W 76/18 (2018.01)

(52) U.S. Cl.
CPC ........... *H04L 1/1816* (2013.01); *H04W 24/10* (2013.01); *H04W 76/18* (2018.02)

(58) Field of Classification Search
CPC ................. H04L 1/1816; H04L 1/1854; H04L 2001/0093; H04L 2001/0097; H04L 1/1896; H04W 24/10; H04W 76/18
See application file for complete search history.

(56) References Cited

U.S. PATENT DOCUMENTS

2021/0184812 A1* 6/2021 MolavianJazi ....... H04L 1/0041
2024/0372689 A1* 11/2024 Gao ...................... H04L 5/0094

* cited by examiner

*Primary Examiner* — Chuong A Ngo
(74) *Attorney, Agent, or Firm* — Holland & Hart LLP/Qualcomm

(57) ABSTRACT

Methods, systems, and devices for wireless communications are described. A user equipment (UE) may receive, from a network entity, control information indicating of a first set of occasions for periodic transmissions and a second set of occasions for periodic transmissions, where an occasion of the first set of occasions is mapped to one or more occasions of the second set of occasions. The UE may transmit a first message during the first set of occasions, receive a feedback message indicating a failure of the first message to be received during the first set of occasions, and transmit a retransmission of the first message on one or more occasions of the second set of occasions. The transmission may be based on the feedback message and in accordance with the mapping between the first set of occasions and the second set of occasions.

30 Claims, 13 Drawing Sheets

RESOURCE OCCASION REPETITION IN WIRELESS COMMUNICATIONS SYSTEMS

FIELD OF TECHNOLOGY

The following relates to wireless communications, including resource occasion repetition in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support resource occasion repetition in wireless communications systems. For example, the described techniques provide for utilizing occasions of a configured grant for retransmission. A network entity may utilize control information to indicate a first set of occasions for periodic transmissions in accordance with a first set of parameters and a second set of occasions for periodic transmissions in accordance with a second set of parameters. In some examples, a mapping between the first set of occasions and the second set of occasions indicates that an occasion of the first set of occasions is mapped to one or more occasions of the second set of occasions. A user equipment (UE) receiving the control information may monitor for a transmission on the first set of occasions. If the UE transmits a feedback indicating an unsuccessful reception of transmission, then the UE may utilize the techniques depicted herein to monitor for a retransmission using the second set of occasions. Otherwise, the second set of occasions may be used by other UEs for transmission and reception.

A method for wireless communication at a user equipment (UE) is described.

The method may include receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, transmitting a first message during the first set of occasions, receiving a feedback message indicating a failure of the first message to be received during the first set of occasions, and transmitting a retransmission of the first message on one or more occasions of the second set of occasions based on the feedback message and in accordance with the mapping between the first set of occasions and the second set of occasions.

An apparatus for wireless communication at a UE is described. The apparatus may include a processor, memory coupled with the processor, and instructions stored in the memory. The instructions may be executable by the processor to cause the apparatus to receive, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, transmit a first message during the first set of occasions, receive a feedback message indicating a failure of the first message to be received during the first set of occasions, and transmit a retransmission of the first message on one or more occasions of the second set of occasions based on the feedback message and in accordance with the mapping between the first set of occasions and the second set of occasions.

Another apparatus for wireless communication at a UE is described. The apparatus may include means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, means for transmitting a first message during the first set of occasions, means for receiving a feedback message indicating a failure of the first message to be received during the first set of occasions, and means for transmitting a retransmission of the first message on one or more occasions of the second set of occasions based on the feedback message and in accordance with the mapping between the first set of occasions and the second set of occasions.

A non-transitory computer-readable medium storing code for wireless communication at a UE is described. The code may include instructions executable by a processor to receive, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, transmit a first message during the first set of occasions, receive a feedback message indicating a failure of the first message to be received during the first set of occasions, and transmit a retransmission of the first message on one or more occasions of the second set of occasions based on the feedback message and in accordance with the mapping between the first set of occasions and the second set of occasions.

In some examples of the method, apparatuses, and non-transitory computer-readable medium described herein, transmitting the first message may include operations, features, means, or instructions for transmitting the first message during the first set of occasions using one or more resources allocated by the network entity in a first mode of operation.

Some examples of the method, apparatuses, and non-transitory computer-readable medium described herein may further include operations, features, means, or instructions for receiving, from the network entity, an indication indicating whether a set of resources for the second set of occasions for periodic transmissions may be associated with a first mode of operation or a second mode of operation.

In some examples of the method, apparatuses, and non-transitory computer-readable medium described herein, the set of resources represents a subband in an uplink communication or a resource pool in a sidelink communication.

In some examples of the method, apparatuses, and non-transitory computer-readable medium described herein, randomly accessing the second set of occasions to identify the one or more occasions of the second set of occasions for transmitting the retransmission of the first message based on determining that the set of resources for the second set of occasions may be associated with the second mode of operation.

Some examples of the method, apparatuses, and non-transitory computer-readable medium described herein may further include operations, features, means, or instructions for receiving, from the network entity, an indication indicating whether a first set of resources for the first set of occasions for periodic transmissions may be associated with a first mode of operation or a second mode of operation and whether a second set of resources for the second set of occasions for periodic transmissions may be associated with the first mode of operation or the second mode of operation.

Some examples of the method, apparatuses, and non-transitory computer-readable medium described herein may further include operations, features, means, or instructions for transmitting the first message using the first set of resources in the first mode of operation in accordance with the indication and transmitting the retransmission of the first using the second set of resources in the second mode of operation in accordance with the indication, where the first message and the retransmission of the first message may be soft combined across the first set of resources and the second set of resources.

In some examples of the method, apparatuses, and non-transitory computer-readable medium described herein, the second set of occasions for periodic transmissions includes a set of transmit occasions.

In some examples of the method, apparatuses, and non-transitory computer-readable medium described herein, the set of transmit occasions supports a transmission on one or more uplink resources or a transmission on one or more sidelink resources or both.

Some examples of the method, apparatuses, and non-transitory computer-readable medium described herein may further include operations, features, means, or instructions for transmitting, to a set of UEs, an indication of the second set of occasions for periodic transmissions in accordance with the second set of parameters.

In some examples of the method, apparatuses, and non-transitory computer-readable medium described herein, the indication includes at least one of a sidelink control indication, an addition to a physical sidelink shared channel, a medium access control (MAC) control element, a radio resource control signal, or a combination thereof.

Some examples of the method, apparatuses, and non-transitory computer-readable medium described herein may further include operations, features, means, or instructions for receiving, from the network entity, a second control information modifying the second set of parameters, where the second set of parameters may be modified based on at least one of a number of feedback messages over a set of occasions, a detection of beam blocking, a remaining packet delay budget, or a combination thereof.

Some examples of the method, apparatuses, and non-transitory computer-readable medium described herein may further include operations, features, means, or instructions for receiving, from the network entity, a second control information modifying a periodicity for the retransmission of the first message based on a remaining packet delay budget.

Some examples of the method, apparatuses, and non-transitory computer-readable medium described herein may further include operations, features, means, or instructions for transmitting, to the network entity, a channel state information report and receiving, from the network entity, a second control information modifying the second set of parameters based on the channel state information report.

In some examples of the method, apparatuses, and non-transitory computer-readable medium described herein, the second set of occasions may be included in one or more time-domain bundles according to a periodicity and second set of parameters includes at least one of a number of occasions per bundle of the one or more time-domain bundles, a time between one or more occasions within a bundle of the one or more time-domain bundles, a periodicity between two consecutive time-domain bundles, or a combination thereof.

In some examples of the method, apparatuses, and non-transitory computer-readable medium described herein, the control information includes a downlink control information, a group-common downlink control information, or both.

A method is described. The method may include receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, monitoring for a first message during the first set of occasions, transmitting a feedback message indicating a failure of the first message to be received during the first set of occasions, and monitoring for a retransmission of the first message on one or more occasions of the second set of occasions based on the feedback message and in accordance with the mapping between the first set of occasions and the second set of occasions.

An apparatus is described. The apparatus may include a processor, memory coupled with the processor, and instructions stored in the memory. The instructions may be executable by the processor to cause the apparatus to receive, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, monitor for a first message during the first set of occasions, transmit a feedback message indicating a failure of the first message to be received during the first set of occasions, and monitor for a retransmission of the first message on one or more occasions of the second set of occasions based on the feedback message and in accordance with the mapping between the first set of occasions and the second set of occasions.

Another apparatus is described. The apparatus may include means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, means for monitoring for a first message during the first set of occasions, means for transmitting a feedback message indicating a failure of the first message to be received during the first set of occasions, and means for monitoring for a retransmission of the first message on one or more occasions of the second set of occasions based on the feedback message and in accordance with the mapping between the first set of occasions and the second set of occasions.

A non-transitory computer-readable medium storing code is described. The code may include instructions executable by a processor to receive, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions, monitor for a first message during the first set of occasions, transmit a feedback message indicating a failure of the first message to be received during the first set of occasions, and monitor for a retransmission of the first message on one or more occasions of the second set of occasions based on the feedback message and in accordance with the mapping between the first set of occasions and the second set of occasions.

In some examples of the method, apparatuses, and non-transitory computer-readable medium described herein, monitoring for the first message may include operations, features, means, or instructions for monitoring for the first message during the first set of occasions using one or more resources allocated by the network entity in a first mode of operation.

Some examples of the method, apparatuses, and non-transitory computer-readable medium described herein may further include operations, features, means, or instructions for receiving, from the network entity, an indication indicating whether a set of resources for the second set of occasions for periodic transmissions may be associated with a first mode of operation or a second mode of operation.

In some examples of the method, apparatuses, and non-transitory computer-readable medium described herein, randomly accessing the second set of occasions to identify the one or more occasions of the second set of occasions for monitoring for the retransmission of the first message based on determining that the set of resources for the second set of occasions may be associated with the second mode of operation.

In some examples of the method, apparatuses, and non-transitory computer-readable medium described herein, the set of resources represents a subband in an uplink communication or a resource pool in a sidelink communication.

Some examples of the method, apparatuses, and non-transitory computer-readable medium described herein may further include operations, features, means, or instructions for receiving, from the network entity, an indication indicating whether a first set of resources for the first set of occasions for periodic transmissions may be associated with a first mode of operation or a second mode of operation and whether a second set of resources for the second set of occasions for periodic transmissions may be associated with the first mode of operation or the second mode of operation.

Some examples of the method, apparatuses, and non-transitory computer-readable medium described herein may further include operations, features, means, or instructions for receiving the first message using the first set of resources in the first mode of operation in accordance with the indication, receiving the retransmission of the first using the second set of resources in the second mode of operation in accordance with the indication, and soft combining the first message and the retransmission of the first message across the first set of resources and the second set of resources.

In some examples of the method, apparatuses, and non-transitory computer-readable medium described herein, the second set of occasions for periodic transmissions includes a set of receive occasions.

In some examples of the method, apparatuses, and non-transitory computer-readable medium described herein, the set of receive occasions supports a reception on one or more uplink resources or a reception on one or more sidelink resources or both.

Some examples of the method, apparatuses, and non-transitory computer-readable medium described herein may further include operations, features, means, or instructions for receiving, from the network entity, a second control information modifying the second set of parameters, where the second set of parameters may be modified based on at least one of a number of feedback messages over a set of occasions or a detection of beam blocking, a remaining packet delay budget, or a combination thereof.

Some examples of the method, apparatuses, and non-transitory computer-readable medium described herein may further include operations, features, means, or instructions for receiving, from the network entity, a second control information modifying a periodicity for the retransmission of the first message based on a remaining packet delay budget.

Some examples of the method, apparatuses, and non-transitory computer-readable medium described herein may further include operations, features, means, or instructions for transmitting, to the network entity, a channel state information report and receiving, from the network entity, a second control information modifying the second set of parameters based on the channel state information report.

In some examples of the method, apparatuses, and non-transitory computer-readable medium described herein, the second set of occasions may be included in one or more time-domain bundles according to a periodicity and second set of parameters includes at least one of a number of occasions per bundle of the one or more time-domain bundles, a time between one or more occasions within a bundle of the one or more time-domain bundles, a periodicity between two consecutive time-domain bundles, or a combination thereof.

In some examples of the method, apparatuses, and non-transitory computer-readable medium described herein, the control information includes a downlink control information, a group-common downlink control information, or both.

DETAILED DESCRIPTION

Figure 1:
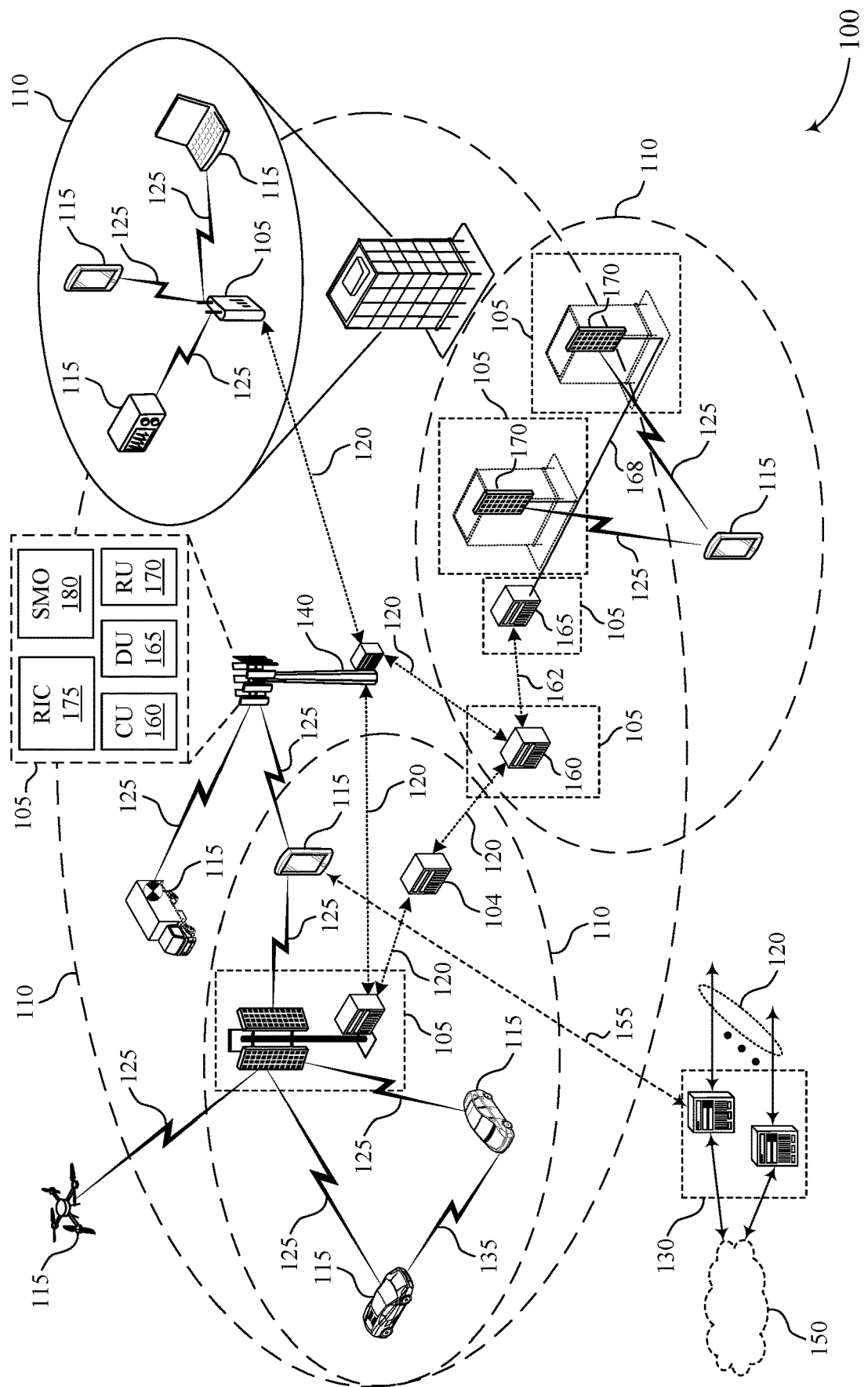
FIG. 1 illustrates an example of a wireless communications system that supports resource occasion repetition in wireless communications systems in accordance with one or more aspects of the present disclosure.

A network entity may configure one or more user equipments (UEs) to use time and frequency resources in accordance with one of two modes of operation. In mode one, a network entity may configure the use of resources for one or more UEs, indicating the use of both a first set of resource occasions and a second set of resource occasions. In mode two, the network entity may configure a resource pool for the one or more UEs to use, rather than specifically assigning each set of resource occasions to each UE. A network entity may configure a UE with a set of periodic resources where a first set of resource occasions is to be used for a first transmission of control information and data, and a second set of resource occasions is to be used for a retransmission. In sidelink communications, a UE may transmit or receive messages using a physical sidelink shared channel (PSSCH) and may transmit or receive feedback using a physical shared feedback channel (PSFCH). In some examples, a first UE may receive a configuration from a base station, and may transmit a message on a first set of resource occasions to a second UE. If the second UE transmits feedback to the first UE indicating negative acknowledgment (NACK), then first UE may send a retransmission on the second set of resource occasions. However, in such cases, the second set of resource occasions may be reserved for the UE, and if there is no feedback indicating a NACK, meaning the first message was successfully transmitted using the first set of resource occasions, then the second set of resource occasions are not used, and therefore are wasted.

To facilitate quick retransmission and reduce wasting of resources, the network entity may configure the UE with multiple sets of resource occasions (e.g., two or more), which may be referred to as a bundle, where the bundle may have a first set and a second set of resource occasions. An occasion in the first set of resource occasions may mapped to one or more occasions in the second set of resource occasions. To configure the second set of resource occasions, there may be three parameters: the number of occasions per bundle, the periodicity of occasions within a bundle, and the periodicity of the bundle. A UE may receive a control information indicative of a first set of occasions for periodic transmissions in accordance with a first set of parameters and a second set of occasions for periodic transmissions in accordance with a second set of parameters. In some examples, a mapping between the first set of occasions and the second set of occasions may indicate that an occasion of the first set of occasions is mapped to one or more occasions of the second set of occasions. In some examples, the resources may be assumed unowned to the UE unless a NACK is received (e.g., on a PSFCH resource). If a UE receives a NACK on a sidelink channel, then the UE may use the resources from the second set of resource occasions to send a retransmission. Additionally, or alternatively, if a UE transmits a NACK to a network entity, then the UE may use the resources from the second set of resource occasions to monitor for a retransmission. If the UE does not receive a NACK, then the network entity may assign the resources of the second set of resource occasions to other UEs. Additionally, or alternatively, the second set of resource occasions may be configured to have a higher number of resources (e.g., subchannels), to be shared among multiple UEs, or to have a shorter or longer periodicity based on a number of resource elements for retransmissions.

Aspects of the disclosure are initially described in the context of wireless communications systems. Aspects of the disclosure are further described in the context of grant configuration and process flow. Aspects of the disclosure are further illustrated by and described with reference to apparatus diagrams, system diagrams, and flowcharts that relate to resource occasion repetition in wireless communications systems.

FIG. 1 illustrates an example of a wireless communications system 100 that supports resource occasion repetition in wireless communications systems in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support resource occasion repetition in wireless communications systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

According to one or more aspects of the present disclosure, a UE 115 may receive, from a network entity 105, control information indicative of a first set of occasions for periodic transmissions in accordance with a first set of parameters and a second set of occasions for periodic transmissions in accordance with a second set of parameters. In some examples, a mapping between the first set of occasions and the second set of occasions may indicate that an occasion of the first set of occasions is mapped to one or more occasions of the second set of occasions. The UE 115 may transmit a first message during the first set of occasions and receive a feedback message indicating a failure of the first message to be received during the first set of occasions, In such cases, the UE 115 may transmit a retransmission of the first message on one or more occasions of the second set of occasions based on the feedback message and in accordance with the mapping between the first set of occasions and the second set of occasions.

In some examples, after receiving the control information, a UE 115 may monitor for a first message during the first set of occasions. The UE 115 may transmit a feedback message indicating a failure of the first message to be received during the first set of occasions. The UE 115 may then monitor for a retransmission of the first message on one or more occasions of the second set of occasions based on the feedback message and in accordance with the mapping between the first set of occasions and the second set of occasions.

Figure 2:
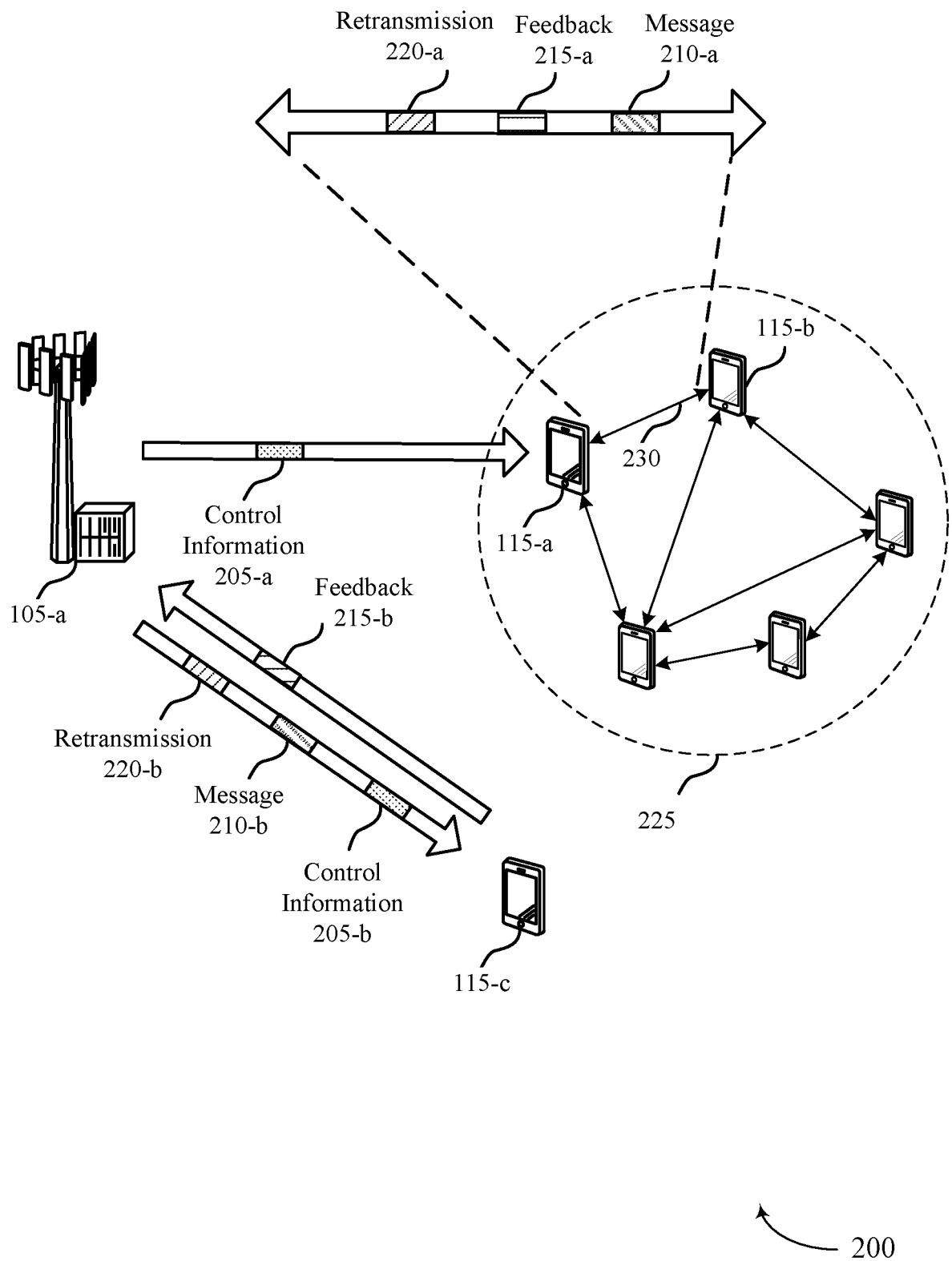
FIG. 2 illustrates an example of a wireless communications system that supports resource occasion repetition in wireless communications systems in accordance with one or more aspects of the present disclosure.

FIG. 2 illustrates an example of a wireless communications system 200 that supports resource occasion repetition in wireless communications systems in accordance with one or more aspects of the present disclosure. The network entity 105-a may be an example of a network entity (e.g., base station, satellite, or other entity) as described with reference to FIG. 1. The UE 115 may be an example of a UE as described with reference to FIG. 1. For example, the network entity 105-a may communicate with the UE 115-a, the UE 115-b, the UE 115-c, or the UEs 115 in the group 225, which may be examples of the corresponding devices described herein with reference to FIG. 1. Additionally, or alternatively, the network entity 105-a may communicate with the UE 115-c in a downlink operation.

Generally, the wireless communications system 200 describes an example of the UEs 115 in group 225 communicating through a sidelink 230, which may be one or more sidelink connections between the different UEs 115 in group 225. The UEs 115 in group 225 may communicate via a sidelink 230. Communications between UEs 115 in group 225 via the sidelink 230 may include the transmission and reception of a control information 205-a received from the network entity 105-a, a message 210-a, a feedback 215-a, a retransmission 220-a. The sidelink 230 may be a physical sidelink shared channel (PSSCH) or a physical sidelink feedback channel (PFSCH).

In some communications systems, the PSSCH may map to a corresponding PSFCH. Resource mapping may be based on a starting subchannel of the PSSCH, a number of subchannels in a PSSCH, the slot containing the PSSCH, the source identifier (ID), or the destination ID. In some examples, the number of available PSFCH resources may be equal to or greater than the number of UEs (e.g., UEs 115 in group 225), such as in groupcast option two. A resource may be defined by a slot (e.g., i) and a subchannel (e.g., j). The starting subchannel of the PSSCH may be defined by a parameter (e.g., sl-PSFCH-CandidateResourceMode, which may be configured as startSubCH). Similarly, the number of sub-channels in the PSSCH may be defined by a parameter (e.g., sl-PSFCH-CandidateResourceMode, which may be configured as allocSubCH).

In some examples, PSFCH resources may be determined by a parameter (e.g., periodPSFCHresource) that may indicate the periodicity of the PFSCH in a number of slots in a resource pool. The parameter may be set to a value (e.g., 0, 1, 2, 4). In some examples, if the value of the parameter is set to 0, the PSFCH transmission from a UE (e.g., UE 115-a) in the resource pool may be disabled. The UE 115-a may transmit the PFSCH in a first slot, where the first slot may include the PSFCH resources, may be one or more slots, may be defined by a parameter (e.g., MinTimeGapPSFCH), or may be in a resource pool after a last slot of the PSSCH reception.

The UE 115-*a* may use the term rbSetPSFCH to determine a set of $M_{PPRB,set}^{PSFCH}$ physical resources blocks (PRBs) in a resource pool for PSFCH transmission. The term numSubchannel may indicate a number of $N_{subch}$ sub-channels for the resource pool, and $N_{PSSCH}^{PSFCH}$ may describe a number of PSSCH slots associated with a PSFCH slot, which is determined by periodPSFCHresource. Equations (1) and (2) further defines the relationships between the various terms that the UE may use when performing sidelink communications.

$$M_{PRB,set}^{PSFCH} = a \cdot N_{subch} \cdot N_{PSSCH}^{PSFCH} \tag{1}$$

$$M_{subch,slot}^{PSFCH} = \frac{M_{PRB,set}^{PSFCH}}{N_{subch} \cdot N_{PSSCH}^{PSFCH}} \tag{2}$$

The UE 115-*a* may allocate the PRBs from $M_{PRB,set}^{PSFCH}$ to slot i and sub-channel j, as represented in equations 3 and 4.

$$[(i+j \cdot N_{PSSCH}^{PSFCH}) \cdot M_{subch,slot}^{PSFCH}, (i+1+ j \cdot N_{PSSCH}^{PSFCH}) \cdot M_{subch,slot}^{PSFCH} - 1] \tag{3}$$

$$0 \leq i \leq N_{PSSCH}^{PSFCH} \text{ and } 0 \leq j \leq N_{subch} \tag{4}$$

In one example, in equation 3, $N_{PSSCH}^{PSFCH}$ may indicate the PSFCH periodicity, and may be set to 4. The $N_{subch}$ may be the number of subchannels for the resource pool, and may be set to 10. $M_{subch,slot}^{PSFCH}$ may be the number of PRBs for PSFCH, and may be equal to 80. Thus, in this example, each sub-channel is associated with 2 PSFCH PRBs. In some examples, the PSFCH may be set to one subchannel.

A network entity (e.g., network entity 105-*a*) may configure a semi-persistent scheduling (SPS) physical downlink shared channel (PDSCH). The configuration may include a periodicity (e.g., p), which may define the time between two SPS PDSCH occasions, and an initial parameter (e.g., KI), which may specify the physical uplink control channel (PUCCH) grant time. The initial parameter (e.g., KI) may define time slots for sending send hybrid automatic repeat request acknowledgment (HARQ-ACK) after receiving the PDSCH.

In an example of SPS configuration, an RRC may configure the SPS periodicity and HARQ-ACK feedback resources. For example, the network entity 105-*a* may transmit an SPS activation downlink control information (DCI), an SPS reactivation DCI, or an SPS release SCI. The UE 115, in some examples, may not monitor for an initial configuration of downlink SPS, because the SPS configuration is not yet active. A network entity (e.g., a gNB, network entity 105-*a*) may utilize SPS activation DCI to activate a configured SPS. After activation, the UE 115 may begin to monitor configured grants in alignment with parameters indicated in the activation DCI. The activation DCI may include transmitting parameters such as MCS, RB allocation, and antenna ports of the SPS transmission. The network entity 105-*a* may utilize SPS reactivation DCI to change the transmitting parameters, such as MCS, RB allocation, or antenna ports of the SPS. The UE 115 may receive the SPS reactivation DCI and monitor configured grants according to the updated parameters indicated in the reactivation DCI. Finally, the network entity 105-*a* may utilize SPS release DCI to deactivate a configure SPS. The UE 115 may stop monitoring for configured grants due to the received SPS release DCI.

A network entity (e.g., a gNB, network entity 105-*a*) may configure a UE (e.g., UE 115-*a*) with one of two configured grant modes, which may be a part of the control information 205-*a*. In configured grant mode two, the network entity may configure the UE with a set of periodic resources that may be used for the first transmission (e.g., new transport blocks). In some examples, each retransmission may be transmission in a number of future scheduled resources (e.g., 2), where the number of future scheduled resources may have a threshold (e.g., a maximum of three scheduled resources per transport block). The network entity 105-*a* may indicate, in the DCI, the time or frequency offsets of resources, where the resources may be utilized if a NACK is observed. In some examples, the resources sizes may be the same across transmissions. In no NACK is observed (by the network entity 105-*a*), the assigned resources are not used, and thus wasted.

In order to increase usage of resources, decrease waste of resources, and enable quick retransmissions, one or more techniques of the present disclosure may provide for a method of resource assignment. The UE 115-*a*, may be one of many UEs in a pool of UEs 115 in the group 225, sharing resources in a resources pool. The network entity 105-*a* may transmit control information 205-*a* using a downlink channel. The control information 205-*a* may be indicative of a first set of occasions for periodic transmissions in accordance with a first set of parameters and a second set of occasions for periodic transmissions in accordance with a second set of parameters, In some instances, a mapping between the first set of occasions and the second set of occasions indicates that an occasion of the first set of occasions is mapped to one or more occasions of the second set of occasions. After receiving the control information 205-*a*, the UE 115-*a* may communicate via sidelink 230 with another UE in the pool, such as UE 115-*b*. The sidelink communications may include feedback 215-*a*, a message 210-*a*, and a retransmission 220-*a*.

The network entity 105-*a* may configure a UE 115-*a* with control information 205-*a*. The control information 205-*a* may include DCI to configure multiple configured grants, such as a set of first configured grant occasions and a set of second configured grant occasions. The control information 205-*a* may include configuration of the configured grant mode, such as indicating whether the resources are mode one or mode two. The initial transmission of resources in control information 205-*a* may be a resource pool configured with mode one, where the first configured grant used for transmission of the message 210-*a* is used on a first resource pool, under SPS.

The retransmission 220-*a* may be performed using a second resource pool in mode two operation, or sensing, where the retransmission may occur on a resource pool in accordance with mode two operation. A receiver (e.g., UE 115) may perform soft combining across the resource pools to receive a retransmission. In some examples, there may be more than one retransmission configured grant. For example, there may be more than one first configured grant for transmitting, and multiple configured grants (e.g., mode one, mode two or a mix) may be used for retransmission of the first configured grant, and may be shared among UEs 115.

The control information 205-*a* may assign the second configured grant occasions to be used when a NACK is observed in a first occasion on the first configured grant.

Further, there may be two configured grants as a part of control information 205-*a*, where each configured grant occasion in a first configured grant is mapped to a set of occasions in a second configured grant. The resources are assumed unowned to the UE 115-*a* unless a NACK, a part of feedback 215-*a*, is received in a PSFCH resource by UE 115-*a*.

In some examples, prior to the NACK reception, the network entity 105-*a* may assign the resources to other UEs 225, such as UE 115-*b*. The UE 115-*a* may transmit a message 210-*a* to the UE 115-*b*. If a NACK transmitted as a part of the feedback 215-*a* from the UE 115-*b* to UE 115-*a*, the UE 115-*a* may use configured resources to transmit the retransmission 220-*a*. The NACK in the feedback 215-*a* informs the network entity 105-*a*, the UE 115-*a*, and the other UEs 115 in the group 225, that the UE 115-*a* is to use the second configured grant's occasions associated with the first configured grant's occasions where the NACK was observed for retransmission.

In some examples, the second configured grant may be in mode one operation, and the UE 115-*a* using the first configured grant may use the second configured grant once a NACK is observed, or the network entity may assign the resources to one of the UEs 225. If the second configured grant is in mode two operation, then, in some examples, all UEs assigned to use the configured grant under mode two may attempt to gain access to the grant. In some other examples, all UEs assigned to use the configured grant under mode two operation may not use the resources once a NACK is observed by the first UE assigned the first configured grant. For example, the UEs 225 may monitor the feedback of another UE, such as the owner of the first configured grant UE 115-*a*. If the UEs 225 receive that the UE 115-*b* set a NACK to UE 115-*a*, then the other UEs 225 may not use the configured grant occasions related to, or mapped to, the NACK PSSCH occasion in the first configured grant. The usage of resources under mode two may be parameterized based on priority or quality of service of transport blocks as well as the cast mode. For example, a set of UEs 115 in a group 225 owning the transport blocks with some priority or cast mode may utilize mode two resources.

In some examples, the UEs 115 in group 225 and the network entity 105-*a* may communicate in accordance with a mixture of mode 1 and mode 2 per resource pool. For example, the first configured grant used for the first transmissions may be mode 1 (e.g., where the network entity allocates the resources), while instead of reserving a second configured grant for retransmission, the network entity 105-*a* may allow one or more UEs 115 to randomly access the second configured grant occasions in a mode two random access. In some examples, a set of UEs 115 in group 225 may randomly access the second configured grant occasions, which may reduce interference.

In some applications of the present disclosure, the configured grants may be toggled configuration for transmitting and retransmitting. A second configured grant may have a higher number of resources (e.g., subchannels) than a first configured grant, which may allow for more reliable transmissions. The second configured grant may also be a shared configured grant among multiple UEs 225. The periodicity of the retransmitted configured grant may be reduced, increased (e.g., if the channel is good), or reconfigured based on a number of resource elements in the retransmissions. The periodicity may be increased or decreased based on the number of NACK feedbacks.

The network entity 105-*a* may use a group common DCI to UEs 115 in group 225. In some examples, the UEs 115 may use the configured grants configured in control information 205-*a*. The network entity 105-*a* may indicate the DCI to each UE (e.g., in a unicast manner) in the group of UEs 225 that may use the retransmission configured grant. In some examples, the UE 115-*a* may relay, provide, or share the information about the control signal 205-*a* including the configured grant using signaling across one or more layers. For example, the UE may use layer 1 (e.g., SCI-1, SCI-2, piggyback on a PSSCH), layer 2 (e.g., PC5-MAC-CE), or layer 3 (e.g., PC5-RRC) signaling to indicate the configured grants to the other UEs. In some examples, the NACK in feedback 215-*a* may confirm the use of the UE 115-*a*, or the UE 115-*a* owning the configured grants from control information 205-*a*, of the second configured grant occasions. The UEs 115 in the group 225 may monitor and sense the configured grant transmitting, similar to sidelink mode 2 in resource allocation, and may use the configured grants if they observe an ACK on the transmitting configured grant, receive indication from the network entity 105-*a*, or receive indication from the UE 115-*a*.

The aspects of the design may be used for downlink SPS or uplink configured grants in downlinks or uplinks. For example, the network entity 105-*a* may transmit a control information 205-*b* to a UE 115-*c* via downlink, where the control information 205-*a* is an example of control information 205-*a*. The control information 205-*a* may configure the UE 115-*c* with two sets of configured grants, and configure the second set to be used for receiving a retransmission. The network entity 105-*a* may transmit a message 210-*b* to the UE 115-*c*, and if the UE 115-*c* transmits a feedback 215-*b* indicating a NACK, the network entity 105-*a* may transmit a retransmission 220-*b*. The UE 115-*c*, as configured by control information 205-*b*, may receive the retransmission 220-*b* using the second configured grant resources. Applications for the design may include URLLC, XR, or HOT applications and services.

Figure 3:
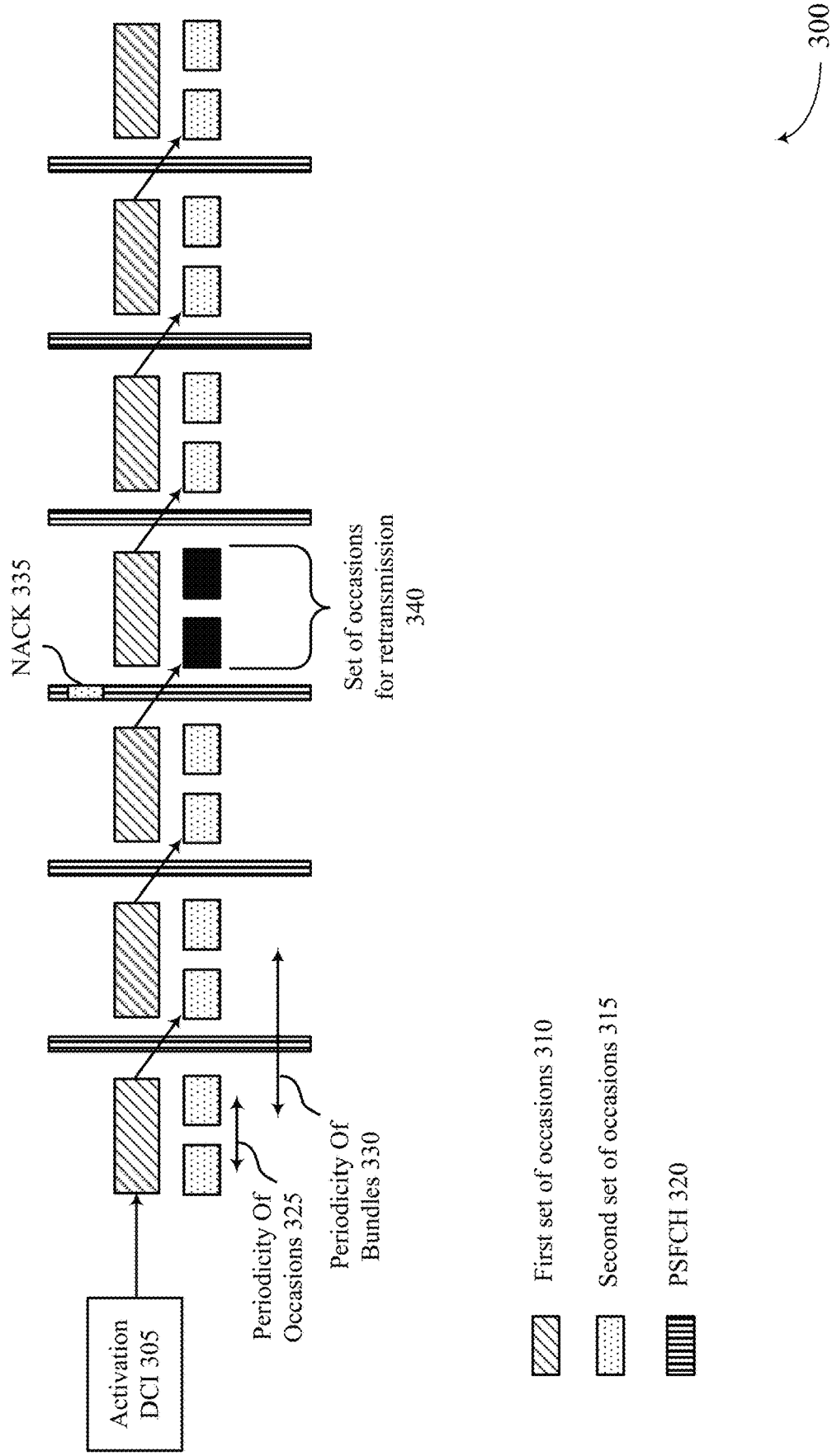
FIG. 3 illustrates an example of a grant configuration that supports resource occasion repetition in wireless communications systems in accordance with one or more aspects of the present disclosure.

FIG. 3 illustrates an example of a grant configuration 300 that supports resource occasion repetition in wireless communications systems in accordance with one or more aspects of the present disclosure. According to one or more aspects of the present disclosure, the grant configuration that may be configured as a part of control information 205-*a*, as described with reference to FIG. 2. To configure the configured grant, or the retransmitting configured grant, a network entity 105 may transmit an activation DCI 305. The activation DCI 305 may activate the DCI for configured grants 1 and 2, and may be transmitted within a time (e.g., K0). The resource configuration as a part of the DCI may configure a first set of occasion 310 and a second set of occasions 315.

A UE 115 may use at least one occasion from the first set of occasions 310 to send the first message (such as, the UE 115-*a* sending the message 210-*a* via sidelink 230, as described in reference to FIG. 2). The UE may receive a feedback in response to the first message. After the feedback (e.g., NACK 335) is sent on the PSFCH 320, as described with reference to FIG. 2, the UE 115 may transmit another message on a second set of occasions 315 for a second message. The second set of occasion 315 may be mapped to the first set of occasions 310 from the previous transmission. For example, the UE 115 may transmit a message using a first set of occasions 310, and receive a NACK 335. The UE 115 may then use the second set of occasions 315 from the next transmission, where the second set of occasions 315 maps to the first set of occasion 310 from the previous transmission. The set of occasions for retransmission 340 may be the second set of occasions 315, and may be used to retransmit the message that failed.

As described with reference to FIG. 3, the grant configuration 300 may have three parameters: the number of occasions in the second set of occasions 315 per the number of occasions in the first set of occasions 310, the periodicity of occasions 325, and the periodicity of bundles 330. The periodicity of occasions 325 may be the time between occasions in the second set of occasions 315. The periodicity of bundles 330 may be time from transmissions of set of occasions 310 and another. The first set of occasions 310 and the second set of occasions 315 may be associated with one or more bundles. The number of occasions in the second set of occasions 315 per the number of occasions in the first set of occasions 310 is not limited by the number depicted, and may be within a small time period.

The periodicities 325 and 330 may be configured (e.g., in DCI, RRC) by the network entity, and may be updated based on a number of NACK/ACKs in a given window of occasion/transmissions or based on detection of beam blocking. One or more periodicities, such as a list, may be configured, where one of the periodicities may be used based on the number of NACKs or the presence of a beam blocker. For example, if the ratio of the number of NACKs to the total number of transmissions is greater than a threshold (e.g., numNACK/totalNumTx>=predefined_threshold), then the initial periodicity at activation DCI may be greater than the second periodicity. The predefined threshold may be configured (e.g., RRC, MAC-CE). In some examples, the increased periodicity may adjust (e.g., increase) the number of resource blocks for a period of time. For example, reducing the periodicity by two may double the number of retransmission resource blocks.

The retransmission configured grant periodicity may be based on a SCI report from the UE, and may be configured through RRC, MAC-CE, or DCI. For example, the retransmission configured grant may be adapted by reconfiguring the periodicities based on MSC reported by the UE such that the number of resource blocks or resource elements for a given target BLER is obtained based on a formula (e.g., Ninfo=numlayer*numRE*ModOrder*CodeRate). Based on MCS given a target BLER, both ModOrder and CodeRate are known. Then, the UE may obtain num RE, and periodicity may be increased based on new num RE over old num RE then either joint or separate encoding within num PDSCH occasions with new periodicity.

The UE may receive indication of MCS indices used across configured grant configurations based on UE recommendations of MCS on the first configured grant. In some examples, the UE may assume the network entity will use the recommendation made by the UE, but if the network entity does not use the recommendation (e.g., did not reduce periodicity of the retransmitting configured grant configuration), the UE may send a NACK, similar to the PDSCH occasion skipping. The network entity may receive feedback from the UE. If there is no CSI feedback, there may be no change the configured grant. The network entity may use the CSI in a timeline defined and signaled (e.g., in RRC, MAC-CE, or DCI), and the timeline may be partially based on the UE's capability to decode and the network entity's ability to decode feedback and response. The reactivation DCI may signal the periodicity based on the CSI. In some examples, a remaining packet delay budget (PDB) may be used for adjusting (e.g., increasing) the periodicity of a retransmission. That is, the smaller the remaining PDB is, the lower the periodicity of the configured grant may be to finish a transmission or retransmission.

Figure 4:
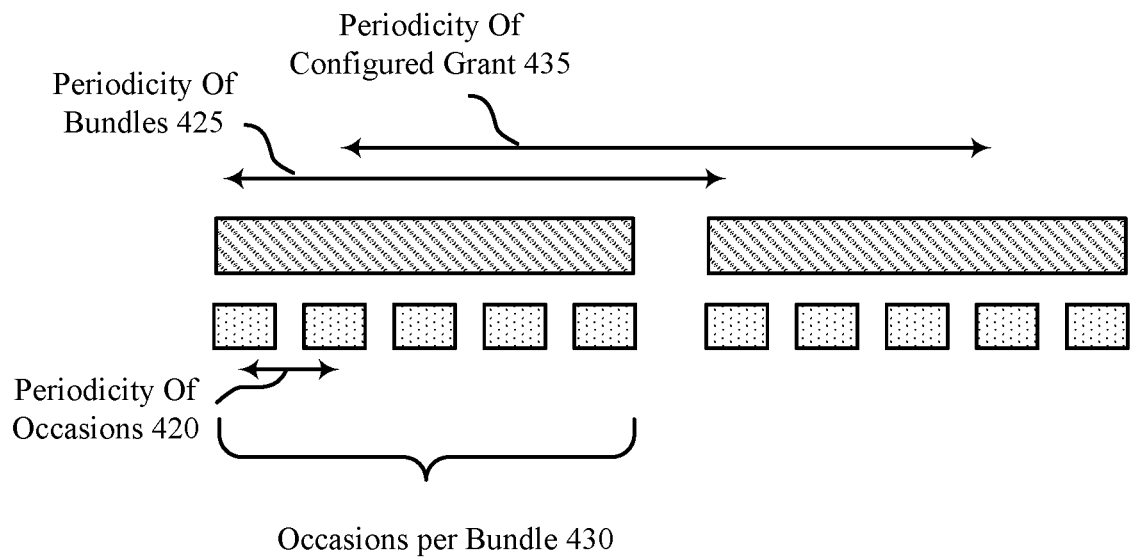
FIG. 4 illustrates an example of an occasion configuration that supports resource occasion repetition in wireless communications systems in accordance with one or more aspects of the present disclosure.
Figure 4:
Figure 4:

FIG. 4 illustrates an example of an occasion configuration 400 that supports resource occasion repetition in wireless communications systems in accordance with one or more aspects of the present disclosure. In particular, FIG. 4 describes a first set of occasions 405 and a second set of occasions 410. The first set of occasions 405 may be an example of the first set of occasions 310, the second set of occasions 410 may be an example of the second set of occasions 315, the periodicity of occasions 420 may be an example of the periodicity of occasions 325, the periodicity of bundles 425 may be an example of the periodicity of bundles 330, as described with reference to FIG. 4 and FIG. 3, respectively.

The periodicity of occasions 420 may be the time between occasions in the second set of occasions 410. The periodicity of bundles 425 may be time from transmissions of one set of occasions to another set of occasions. The number of occasions in the second set of occasions 410 per occasion in the first set of occasions 405 may not be limited by the number depicted, and may be within a small time period. The periodicity of the configured grant 435 may indicate the time between configured grants 435, such as if multiple bundles were configured.

In some examples, not all the message received using the first set of occasions 405 may be retransmitted. The second set of occasions 410 may have occasions that are smaller than the first set of occasions 405, which may allow the UE to transmit the portion of the data that was not received using a smaller occasion.

Figure 5:
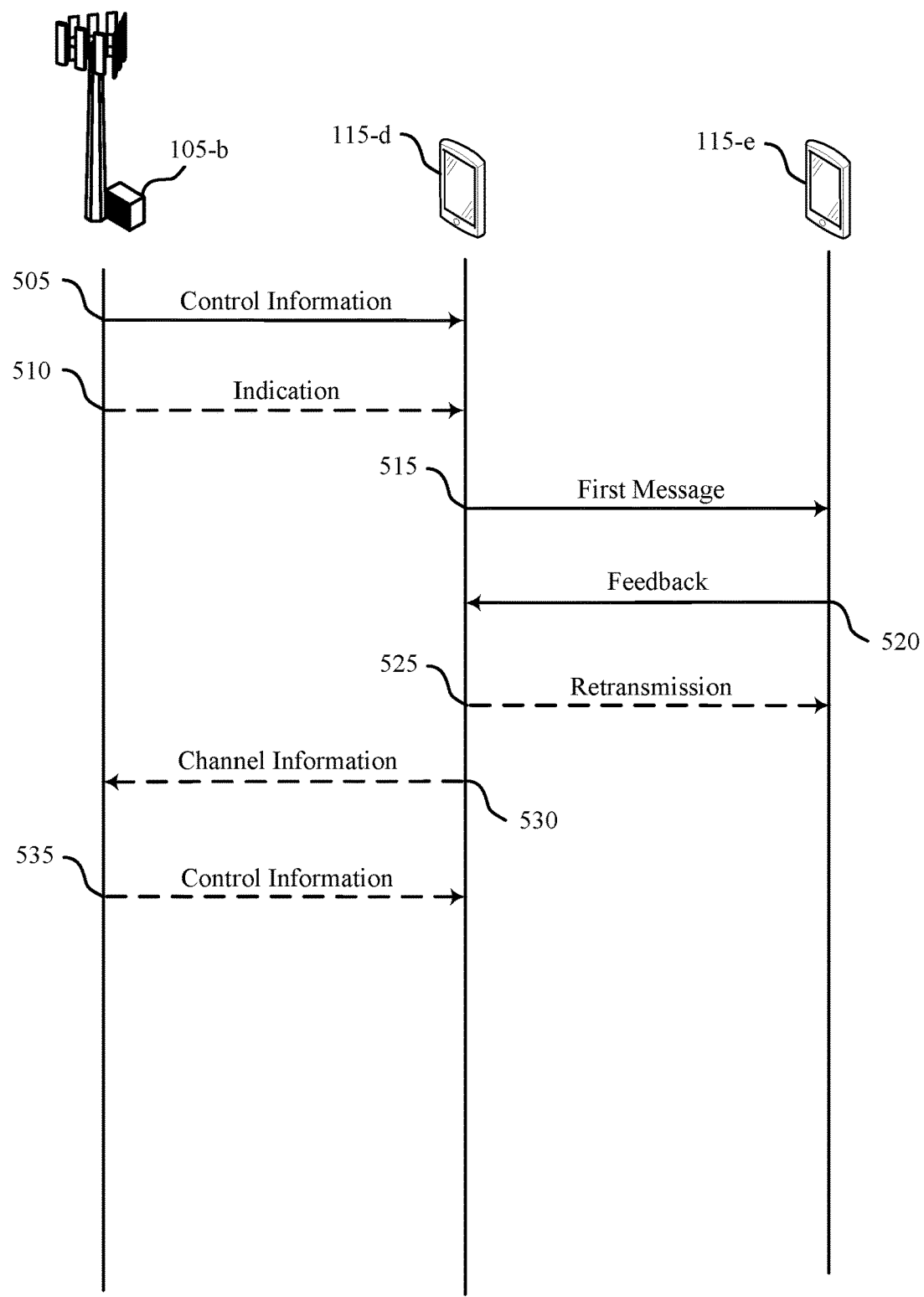
FIG. 5 illustrates an example of a process flow that supports resource occasion repetition in wireless communications systems in accordance with one or more aspects of the present disclosure.

FIG. 5 illustrates an example of a process flow 500 that supports resource occasion repetition in wireless communications systems in accordance with one or more aspects of the present disclosure. The network entity 105-b may be an example of the network entity 105-a, the UE 115-d may be an example of UE 115-a, and the UE 115-e may be an example of the UE 115-b, as referenced in FIG. 2.

In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the network entity 105-b may transmit, and the UE 115-d may receive, control information. The control information may include a downlink control information, a group-common downlink control information, or both. The control information may indicate a first set of occasions for periodic transmissions corresponding to a first set of parameters and a second set of occasions for periodic transmissions corresponding to a second set of parameters. The first set of occasions may be mapped to the second set of occasions, where an occasion of the first set of occasions is mapped to one or more occasions of the second set of occasions. The second set of occasions for periodic transmissions may include a set of transmit occasions. The network entity 105-b and the UE 115-d and the UE 115-d support a transmission on one or more uplink resources, a transmission on one or more sidelink resources, or both.

In some examples, the second set of occasions may be included in one or more time-domain bundles according to a periodicity. The second set of parameters may include one or more of a number of occasions per bundle of the one or more time-domain bundles, a time between one or more occasions within a bundle of the one or more time-domain bundles, or a periodicity between two consecutive time-domain bundles.

At 510, the network entity 105-b may optionally transmit, and the UE 115-d may receive, an indication. The indication may indicate whether a set of resources for the second set of occasions for periodic transmissions is associated with a first mode of operation or a second mode of operation. In some examples, the UE 115-d may determine determining that the set of resources for the second set of occasions is associated with the second mode of operation, and the UE 115-d may randomly access the second set of occasions to identify the one or more occasions of the second set of occasions for transmitting the retransmission of the first message. The set of resources may represent a subband in an uplink communication or a resource pool in a sidelink communication.

In some examples, the indication may be transmitted from the network entity 105-b to multiple UEs, or a set of UEs, such as UE 115-d and UE 115-e. The indication transmitted to a set of UEs may include an indication of the second set of occasions for periodic transmissions in accordance with the second set of parameters. wherein the indication comprises at least one of a sidelink control indication, an addition to a physical sidelink shared channel, a MAC control element, a radio resource control signal, or a combination.

At 515, the UE 115-d may transmit a first message to the UE 115-e using sidelink. The first message may be transmitted during the first set of occasions using one or more resources allocated by the network entity 105-b in a first mode of operation. The UE 115-d may transmit the first message using the first set of resources in the first mode of operation in accordance with the indication.

At 520, the UE 115-e may transmit feedback to the UE 115-d. The feedback message may indicate a failure of the first message to be received during the first set of occasions. At 525, the UE 115-d may optionally retransmit the first message to the UE 115-e. The retransmission of the first message may be transmitted using one or more occasions of the second set of occasions based at least in part on the feedback message and in corresponding to the mapping between the first set of occasions and the second set of occasions. The UE 115-e may transmit the retransmission of the first message using the second set of resources in the second mode of operation according to the indication. The first message and the retransmission of the first message may be soft combined across the first set of resources and the second set of resources.

At 530, the UE 115-d may transmit, and the 105-b may receive, channel information including a channel state information report. At 535, the UE 115-d may receive from the network entity 105-b a second control information modifying the second set of parameters. The second set of parameters may be modified based on one or more of a number of feedback messages over a set of occasions, a detection of beam blocking, a remaining PDB, or a combination. The second control information may modify a periodicity for the retransmission of the first message based at least in part on a remaining packet delay budget or the channel state information report. The packet delay budget may adjust (e.g., increase) the periodicity of the retransmission. For example, if the remaining packet delay budget is smaller, the periodicity of the configured grant may also be smaller, to quickly transmit or retransmit.

Figure 6:
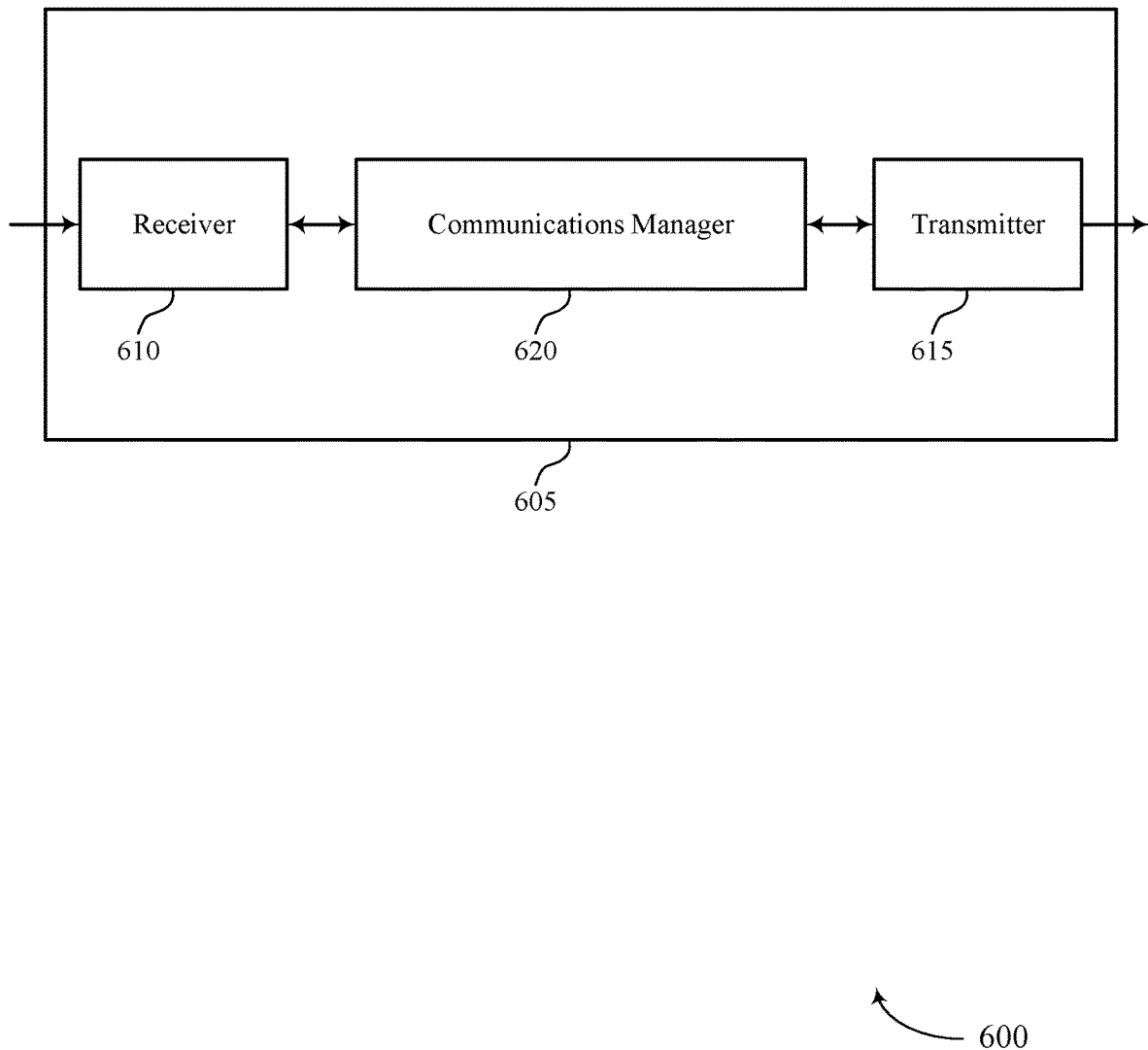
FIGS. 6 and 7 show block diagrams of devices that support resource occasion repetition in wireless communications systems in accordance with one or more aspects of the present disclosure.

FIG. 6 shows a block diagram 600 of a device 605 that supports resource occasion repetition in wireless communications systems in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource occasion repetition in wireless communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource occasion repetition in wireless communications systems). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of resource occasion repetition in wireless communications systems as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The communications manager 620 may be configured as or otherwise support a means for transmitting a first message during the first set of occasions. The communications manager 620 may be configured as or otherwise support a means for receiving a feedback message indicating a failure of the first message to be received during the first set of occasions. The communications manager 620 may be configured as or otherwise support a means for transmitting a retransmission of the first message on one or more occasions of the second set of occasions based on the feedback message and in accordance with the mapping between the first set of occasions and the second set of occasions.

For example, the communications manager 620 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The communications manager 620 may be configured as or otherwise support a means for monitoring for a first message during the first set of occasions. The communications manager 620 may be configured as or otherwise support a means for transmitting a feedback message indicating a failure of the first message to be received during the first set of occasions. The communications manager 620 may be configured as or otherwise support a means for monitoring for a retransmission of the first message on one or more occasions of the second set of occasions based on the feedback message and in accordance with the mapping between the first set of occasions and the second set of occasions.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
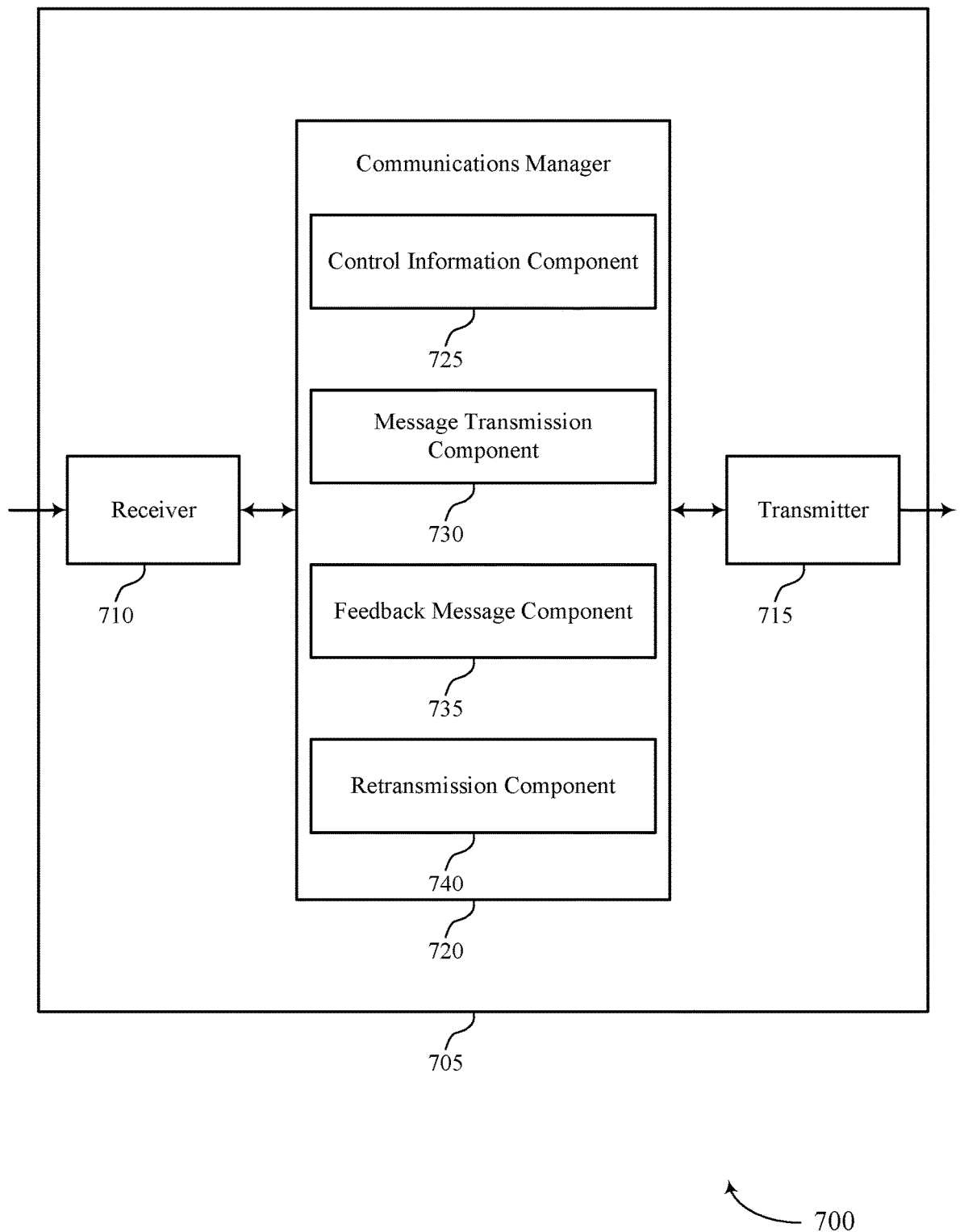

FIG. 7 shows a block diagram 700 of a device 705 that supports resource occasion repetition in wireless communications systems in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource occasion repetition in wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource occasion repetition in wireless communications systems). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of resource occasion repetition in wireless communications systems as described herein. For example, the communications manager 720 may include a control information component 725, a message transmission component 730, a feedback message component 735, a retransmission component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The control information component 725 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The message transmission component 730 may be configured as or otherwise support a means for transmitting a first message during the first set of occasions. The feedback message component 735 may be configured as or otherwise support a means for receiving a feedback message indicating a failure of the first message to be received during the first set of occasions. The retransmission component 740 may be configured as or otherwise support a means for transmitting a retransmission of the first message on one or more occasions of the second set of occasions based on the feedback message and in accordance with the mapping between the first set of occasions and the second set of occasions.

The control information component 725 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The message transmission component 730 may be configured as or otherwise support a means for monitoring for a first message during the first set of occasions. The feedback message component 735 may be configured as or otherwise support a means for transmitting a feedback message indicating a failure of the first message to be received during the first set of occasions. The retransmission component 740 may be configured as or otherwise support a means for monitoring for a retransmission of the first message on one or more occasions of the second set of occasions based on the feedback message and in accordance with the mapping between the first set of occasions and the second set of occasions.

Figure 8:
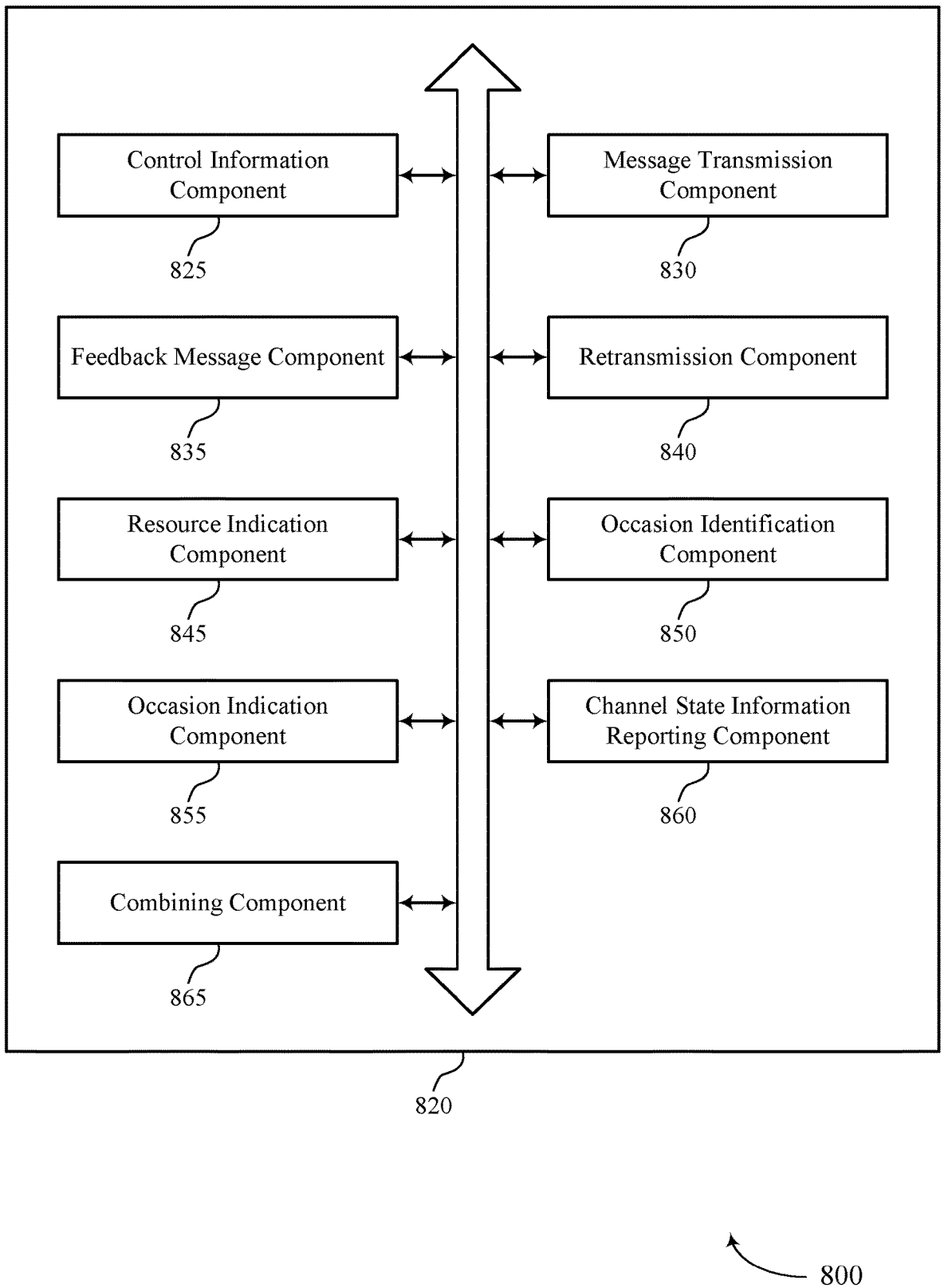
FIG. 8 shows a block diagram of a communications manager that supports resource occasion repetition in wireless communications systems in accordance with one or more aspects of the present disclosure.

FIG. 8 shows a block diagram 800 of a communications manager 820 that supports resource occasion repetition in wireless communications systems in accordance with one or more aspects of the present disclosure. The communications manager 820 may be an example of aspects of a communications manager 620, a communications manager 720, or both, as described herein. The communications manager 820, or various components thereof, may be an example of means for performing various aspects of resource occasion repetition in wireless communications systems as described herein. For example, the communications manager 820 may include a control information component 825, a message transmission component 830, a feedback message component 835, a retransmission component 840, a resource indication component 845, an occasion identification component 850, an occasion indication component 855, a channel state information reporting component 860, a combining component 865, or any combination thereof. Each of these components may communicate, directly or indirectly, with one another (e.g., via one or more buses).

The communications manager 820 may support wireless communication at a UE in accordance with examples as disclosed herein. The control information component 825 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The message transmission component 830 may be configured as or otherwise support a means for transmitting a first message during the first set of occasions. The feedback message component 835 may be configured as or otherwise support a means for receiving a feedback message indicating a failure of the first message to be received during the first set of occasions. The retransmission component 840 may be configured as or otherwise support a means for transmitting a retransmission of the first message on one or more occasions of the second set of occasions based on the feedback message and in accordance with the mapping between the first set of occasions and the second set of occasions.

In some examples, to support transmitting the first message, the message transmission component 830 may be configured as or otherwise support a means for transmitting the first message during the first set of occasions using one or more resources allocated by the network entity in a first mode of operation.

In some examples, the resource indication component 845 may be configured as or otherwise support a means for receiving, from the network entity, an indication indicating whether a set of resources for the second set of occasions for periodic transmissions is associated with a first mode of operation or a second mode of operation.

In some examples, the set of resources represents a subband in an uplink communication or a resource pool in a sidelink communication. In some examples, the occasion identification component 850 may be configured as or otherwise support a means for randomly accessing the second set of occasions to identify the one or more occasions of the second set of occasions for transmitting the retransmission of the first message based on determining that the set of resources for the second set of occasions is associated with the second mode of operation.

In some examples, the resource indication component 845 may be configured as or otherwise support a means for receiving, from the network entity, an indication indicating whether a first set of resources for the first set of occasions for periodic transmissions is associated with a first mode of operation or a second mode of operation and whether a second set of resources for the second set of occasions for periodic transmissions is associated with the first mode of operation or the second mode of operation.

In some examples, the message transmission component 830 may be configured as or otherwise support a means for transmitting the first message using the first set of resources in the first mode of operation in accordance with the indication. In some examples, the retransmission component 840 may be configured as or otherwise support a means for transmitting the retransmission of the first using the second set of resources in the second mode of operation in accordance with the indication, where the first message and the retransmission of the first message are soft combined across the first set of resources and the second set of resources.

In some examples, the second set of occasions for periodic transmissions includes a set of transmit occasions. In some examples, the set of transmit occasions supports a transmission on one or more uplink resources or a transmission on one or more sidelink resources or both.

In some examples, the occasion indication component 855 may be configured as or otherwise support a means for transmitting, to a set of UEs, an indication of the second set of occasions for periodic transmissions in accordance with the second set of parameters.

In some examples, the indication includes at least one of a sidelink control indication, an addition to a physical sidelink shared channel, a MAC control element, a radio resource control signal, or a combination thereof.

In some examples, the control information component 825 may be configured as or otherwise support a means for receiving, from the network entity, a second control information modifying the second set of parameters, where the second set of parameters are modified based on at least one of a number of feedback messages over a set of occasions, a detection of beam blocking, a remaining packet delay budget, or a combination thereof.

In some examples, the control information component 825 may be configured as or otherwise support a means for receiving, from the network entity, a second control information modifying a periodicity for the retransmission of the first message based on a remaining packet delay budget.

In some examples, the channel state information reporting component 860 may be configured as or otherwise support a means for transmitting, to the network entity, a channel state information report. In some examples, the control information component 825 may be configured as or otherwise support a means for receiving, from the network entity, a second control information modifying the second set of parameters based on the channel state information report.

In some examples, the second set of occasions are included in one or more time-domain bundles according to a periodicity. In some examples, second set of parameters includes at least one of a number of occasions per bundle of the one or more time-domain bundles, a time between one or more occasions within a bundle of the one or more time-domain bundles, a periodicity between two consecutive time-domain bundles, or a combination thereof. In some examples, the control information includes a downlink control information, a group-common downlink control information, or both.

In some examples, the control information component 825 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. In some examples, the message transmission component 830 may be configured as or otherwise support a means for monitoring for a first message during the first set of occasions. In some examples, the feedback message component 835 may be configured as or otherwise support a means for transmitting a feedback message indicating a failure of the first message to be received during the first set of occasions. In some examples, the retransmission component 840 may be configured as or otherwise support a means for monitoring for a retransmission of the first message on one or more occasions of the second set of occasions based on the feedback message and in accordance with the mapping between the first set of occasions and the second set of occasions.

In some examples, to support monitoring for the first message, the message transmission component 830 may be configured as or otherwise support a means for monitoring for the first message during the first set of occasions using one or more resources allocated by the network entity in a first mode of operation.

In some examples, the resource indication component 845 may be configured as or otherwise support a means for receiving, from the network entity, an indication indicating whether a set of resources for the second set of occasions for periodic transmissions is associated with a first mode of operation or a second mode of operation.

In some examples, the occasion identification component 850 may be configured as or otherwise support a means for randomly accessing the second set of occasions to identify the one or more occasions of the second set of occasions for monitoring for the retransmission of the first message based on determining that the set of resources for the second set of occasions is associated with the second mode of operation.

In some examples, the set of resources represents a subband in an uplink communication or a resource pool in a sidelink communication.

In some examples, the resource indication component 845 may be configured as or otherwise support a means for receiving, from the network entity, an indication indicating whether a first set of resources for the first set of occasions for periodic transmissions is associated with a first mode of operation or a second mode of operation and whether a second set of resources for the second set of occasions for periodic transmissions is associated with the first mode of operation or the second mode of operation.

In some examples, the message transmission component 830 may be configured as or otherwise support a means for receiving the first message using the first set of resources in the first mode of operation in accordance with the indication. In some examples, the retransmission component 840 may be configured as or otherwise support a means for receiving the retransmission of the first using the second set of resources in the second mode of operation in accordance with the indication. In some examples, the combining component 865 may be configured as or otherwise support a means for soft combining the first message and the retransmission of the first message across the first set of resources and the second set of resources.

In some examples, the second set of occasions for periodic transmissions includes a set of receive occasions. In some examples, the set of receive occasions supports a reception on one or more uplink resources or a reception on one or more sidelink resources or both.

In some examples, the control information component 825 may be configured as or otherwise support a means for receiving, from the network entity, a second control information modifying the second set of parameters, where the second set of parameters are modified based on at least one of a number of feedback messages over a set of occasions or a detection of beam blocking, a remaining packet delay budget, or a combination thereof.

In some examples, the control information component 825 may be configured as or otherwise support a means for receiving, from the network entity, a second control information modifying a periodicity for the retransmission of the first message based on a remaining packet delay budget.

In some examples, the channel state information reporting component 860 may be configured as or otherwise support a means for transmitting, to the network entity, a channel state information report. In some examples, the control information component 825 may be configured as or otherwise support a means for receiving, from the network entity, a second control information modifying the second set of parameters based on the channel state information report.

In some examples, the second set of occasions are included in one or more time-domain bundles according to a periodicity. In some examples, second set of parameters includes at least one of a number of occasions per bundle of the one or more time-domain bundles, a time between one or more occasions within a bundle of the one or more time-domain bundles, a periodicity between two consecutive time-domain bundles, or a combination thereof. In some examples, the control information includes a downlink control information, a group-common downlink control information, or both.

Figure 9:
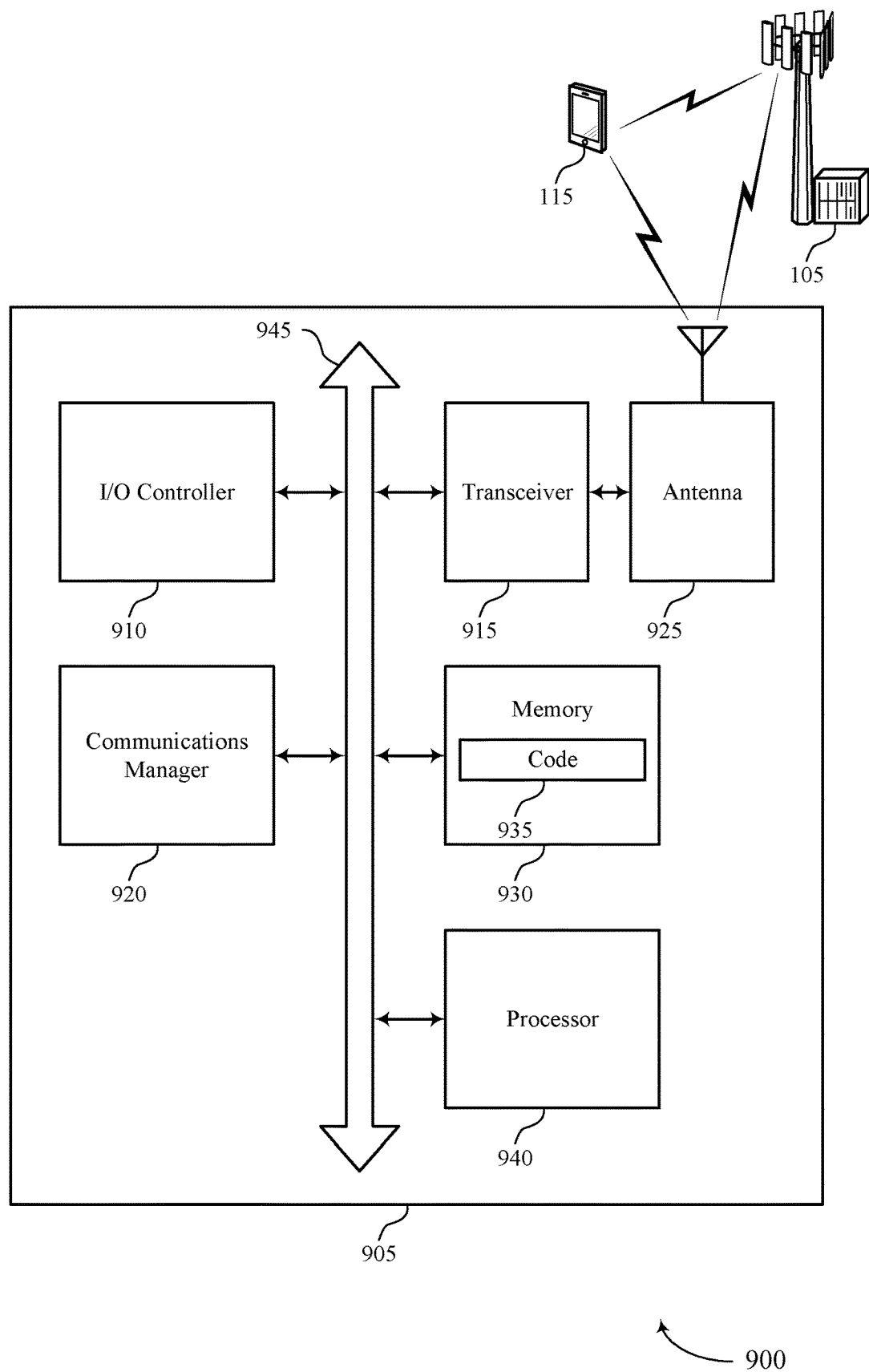
FIG. 9 shows a diagram of a system including a device that supports resource occasion repetition in wireless communications systems in accordance with one or more aspects of the present disclosure.

FIG. 9 shows a diagram of a system 900 including a device 905 that supports resource occasion repetition in wireless communications systems in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting resource occasion repetition in wireless communications systems). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The communications manager 920 may be configured as or otherwise support a means for transmitting a first message during the first set of occasions. The communications manager 920 may be configured as or otherwise support a means for receiving a feedback message indicating a failure of the first message to be received during the first set of occasions. The communications manager 920 may be configured as or otherwise support a means for transmitting a retransmission of the first message on one or more occasions of the second set of occasions based on the feedback message and in accordance with the mapping between the first set of occasions and the second set of occasions.

For example, the communications manager 920 may be configured as or otherwise support a means for receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The communications manager 920 may be configured as or otherwise support a means for monitoring for a first message during the first set of occasions. The communications manager 920 may be configured as or otherwise support a means for transmitting a feedback message indicating a failure of the first message to be received during the first set of occasions. The communications manager 920 may be configured as or otherwise support a means for monitoring for a retransmission of the first message on one or more occasions of the second set of occasions based on the feedback message and in accordance with the mapping between the first set of occasions and the second set of occasions.

By including or configuring the communications manager 920 in accordance with examples as described herein, the device 905 may support techniques for improved communication reliability, reduced latency, improved user experience related to reduced processing, reduced power consumption, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of resource occasion repetition in wireless communications systems as described herein, or the processor 940 and the memory 930 may be otherwise configured to perform or support such operations.

Figure 10:
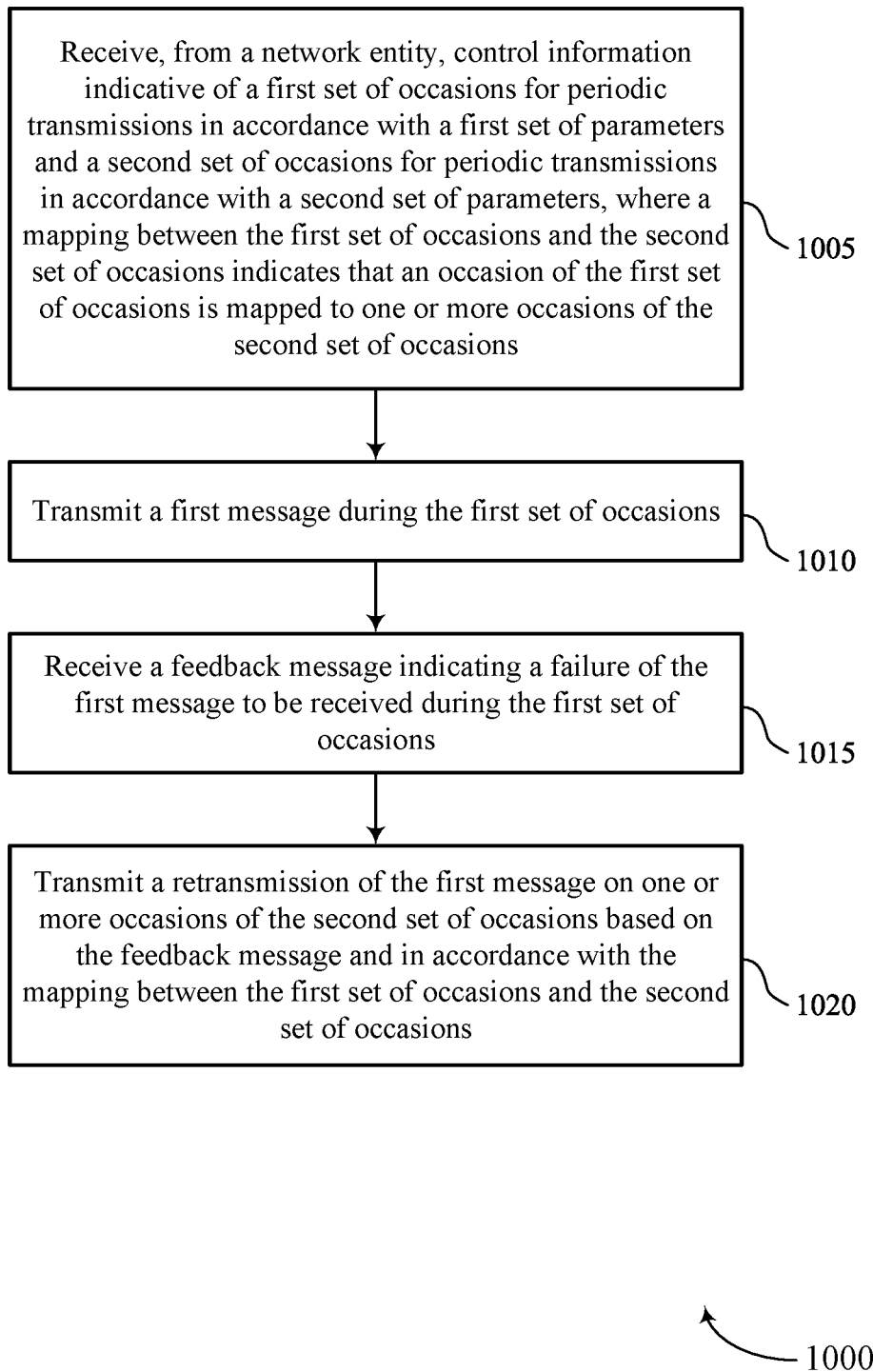
FIGS. 10 through 13 show flowcharts illustrating methods that support resource occasion repetition in wireless communications systems in accordance with one or more aspects of the present disclosure.

FIG. 10 shows a flowchart illustrating a method 1000 that supports resource occasion repetition in wireless communications systems in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The operations of 1005 may be performed in accordance with examples as disclosed herein. In some examples, aspects of the operations of 1005 may be performed by a control information component 825 as described with reference to FIG. 8.

At 1010, the method may include transmitting a first message during the first set of occasions. The operations of 1010 may be performed in accordance with examples as disclosed herein. In some examples, aspects of the operations of 1010 may be performed by a message transmission component 830 as described with reference to FIG. 8.

At 1015, the method may include receiving a feedback message indicating a failure of the first message to be received during the first set of occasions. The operations of 1015 may be performed in accordance with examples as disclosed herein. In some examples, aspects of the operations of 1015 may be performed by a feedback message component 835 as described with reference to FIG. 8.

At 1020, the method may include transmitting a retransmission of the first message on one or more occasions of the second set of occasions based on the feedback message and in accordance with the mapping between the first set of occasions and the second set of occasions. The operations of 1020 may be performed in accordance with examples as disclosed herein. In some examples, aspects of the operations of 1020 may be performed by a retransmission component 840 as described with reference to FIG. 8.

Figure 11:
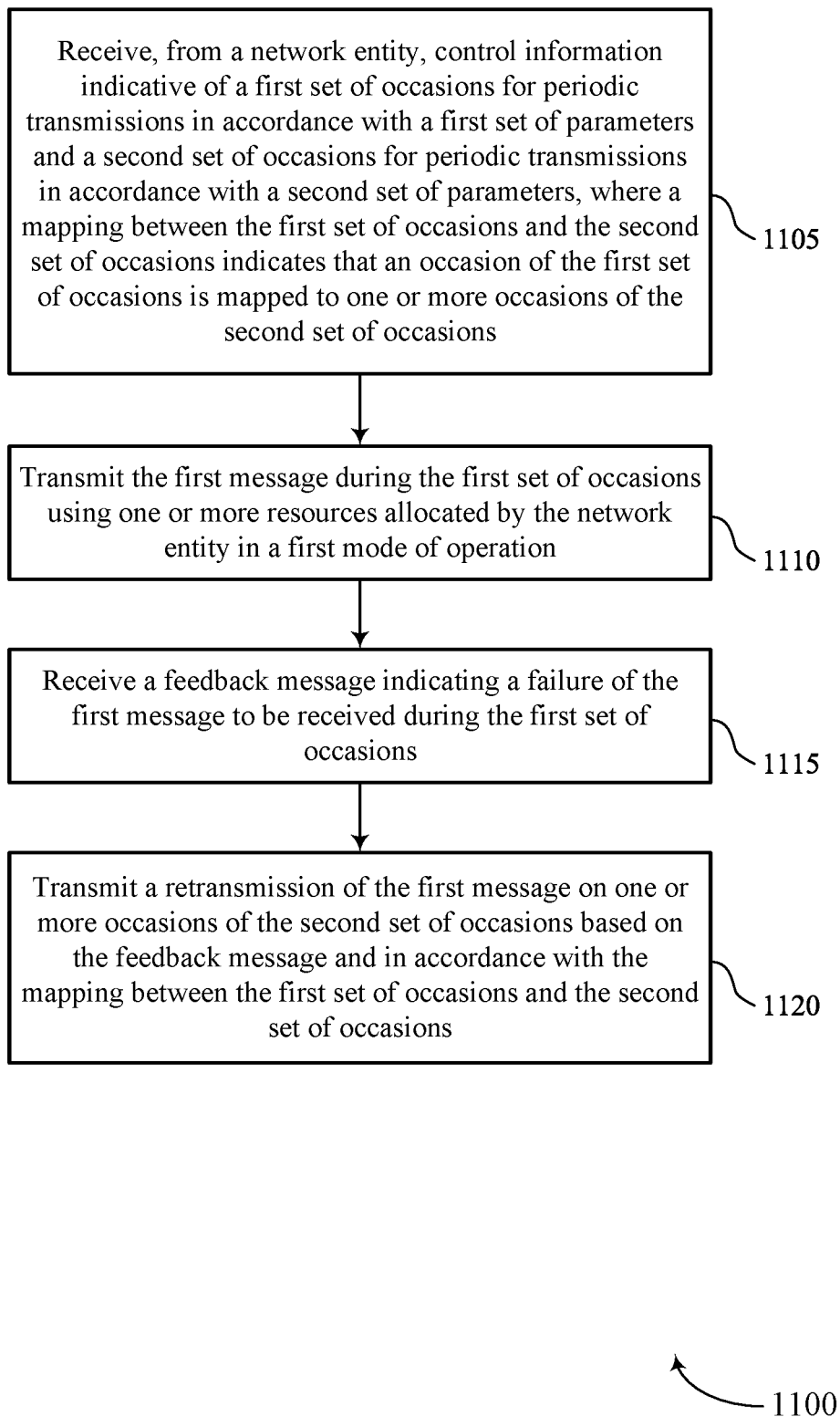

FIG. 11 shows a flowchart illustrating a method 1100 that supports resource occasion repetition in wireless communications systems in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The operations of 1105 may be performed in accordance with examples as disclosed herein. In some examples, aspects of the operations of 1105 may be performed by a control information component 825 as described with reference to FIG. 8.

At 1110, the method may include transmitting the first message during the first set of occasions using one or more resources allocated by the network entity in a first mode of operation. The operations of 1110 may be performed in accordance with examples as disclosed herein. In some examples, aspects of the operations of 1110 may be performed by a message transmission component 830 as described with reference to FIG. 8.

At 1115, the method may include receiving a feedback message indicating a failure of the first message to be received during the first set of occasions. The operations of 1115 may be performed in accordance with examples as disclosed herein. In some examples, aspects of the operations of 1115 may be performed by a feedback message component 835 as described with reference to FIG. 8.

At 1120, the method may include transmitting a retransmission of the first message on one or more occasions of the second set of occasions based on the feedback message and in accordance with the mapping between the first set of occasions and the second set of occasions. The operations of 1120 may be performed in accordance with examples as disclosed herein. In some examples, aspects of the operations of 1120 may be performed by a retransmission component 840 as described with reference to FIG. 8.

Figure 12:
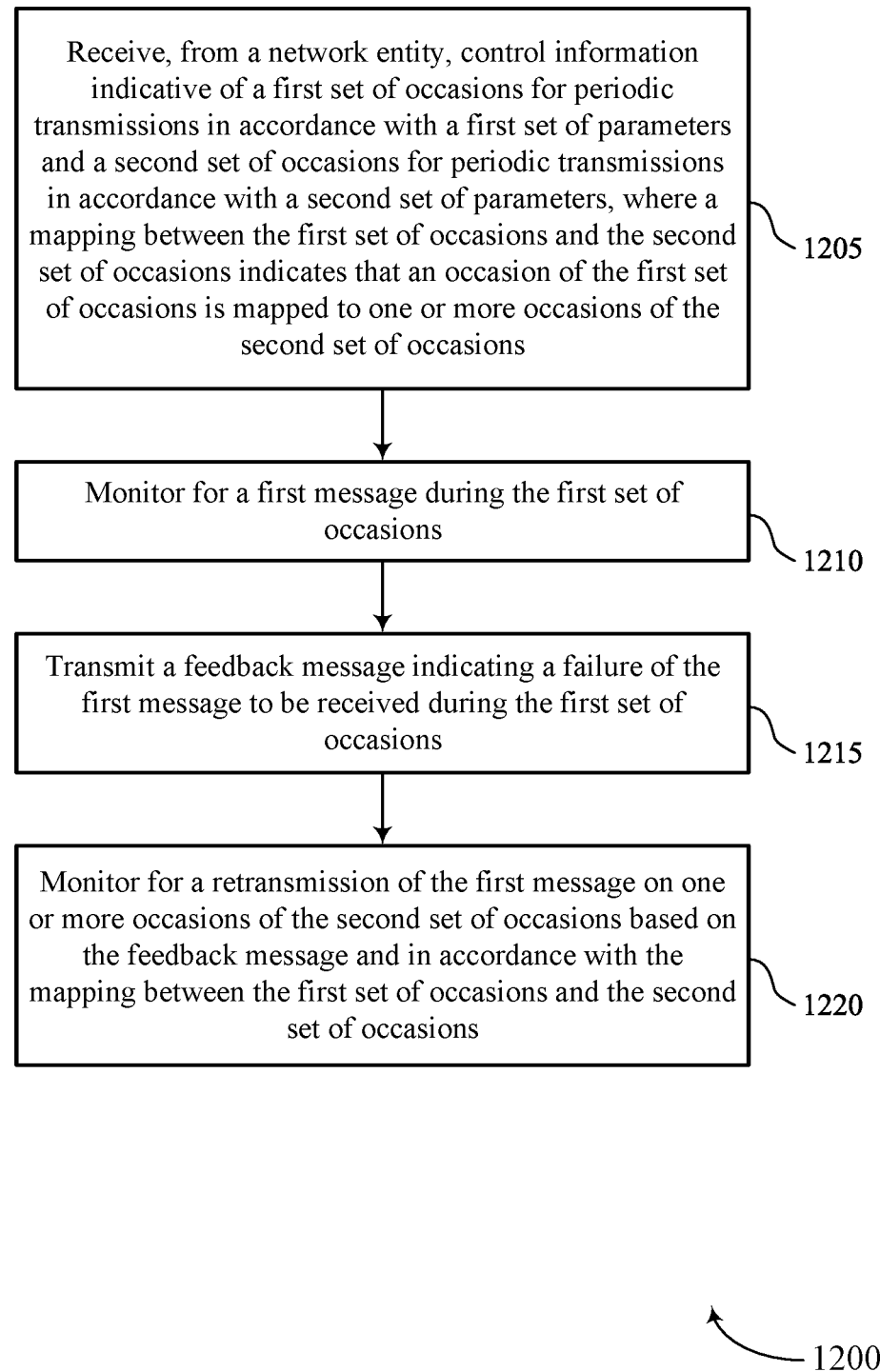

FIG. 12 shows a flowchart illustrating a method 1200 that supports resource occasion repetition in wireless communications systems in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The operations of 1205 may be performed in accordance with examples as disclosed herein. In some examples, aspects of the operations of 1205 may be performed by a control information component 825 as described with reference to FIG. 8.

At 1210, the method may include monitoring for a first message during the first set of occasions. The operations of 1210 may be performed in accordance with examples as disclosed herein. In some examples, aspects of the operations of 1210 may be performed by a message transmission component 830 as described with reference to FIG. 8.

At 1215, the method may include transmitting a feedback message indicating a failure of the first message to be received during the first set of occasions. The operations of 1215 may be performed in accordance with examples as disclosed herein. In some examples, aspects of the operations of 1215 may be performed by a feedback message component 835 as described with reference to FIG. 8.

At 1220, the method may include monitoring for a retransmission of the first message on one or more occasions of the second set of occasions based on the feedback message and in accordance with the mapping between the first set of occasions and the second set of occasions. The operations of 1220 may be performed in accordance with examples as disclosed herein. In some examples, aspects of the operations of 1220 may be performed by a retransmission component 840 as described with reference to FIG. 8.

Figure 13:
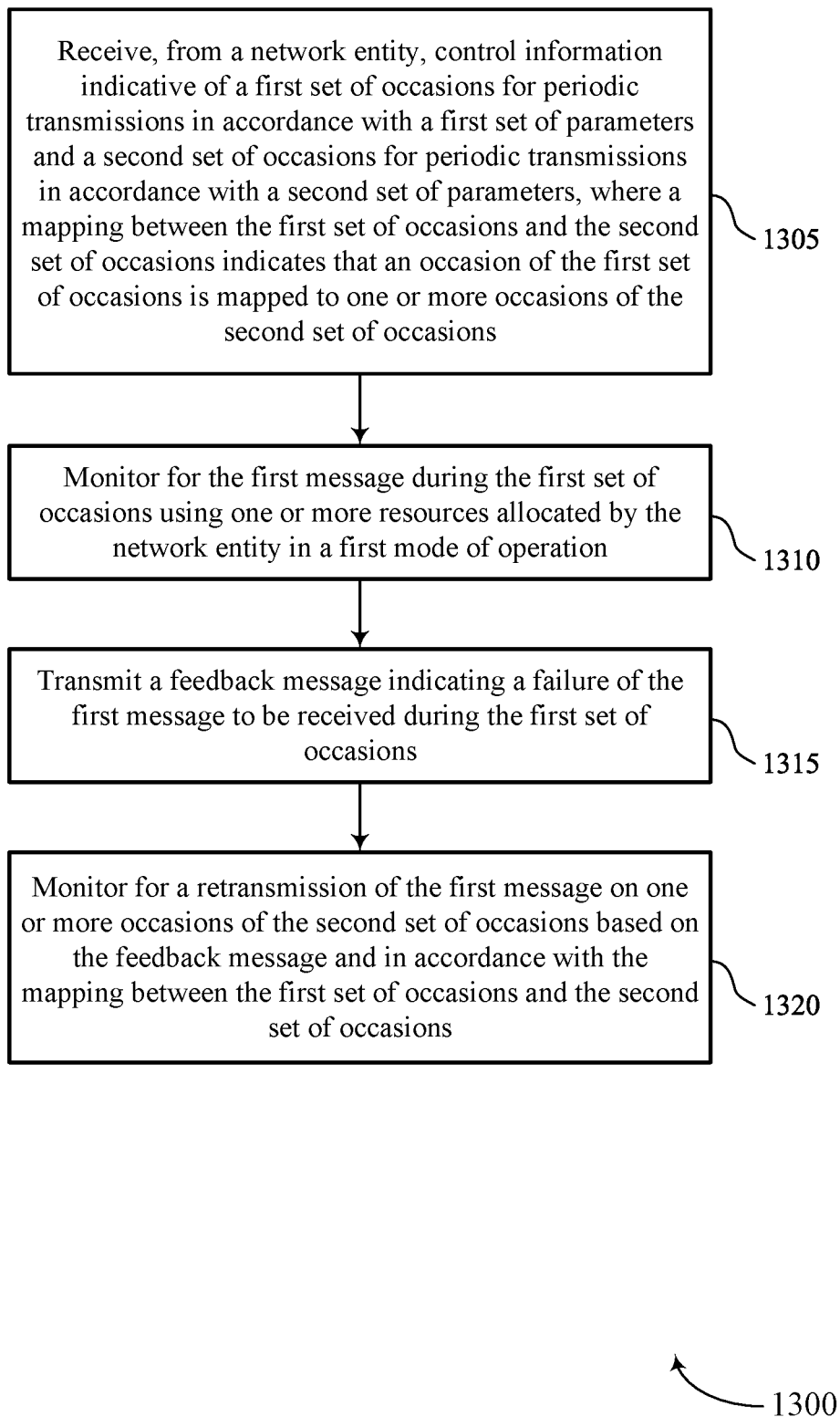

FIG. 13 shows a flowchart illustrating a method 1300 that supports resource occasion repetition in wireless communications systems in accordance with one or more aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control information indicative of a first set of occasions for periodic transmissions in accordance with a first set of parameters and a second set of occasions for periodic transmissions in accordance with a second set of parameters, where a mapping between the first set of occasions and the second set of occasions indicates that an occasion of the first set of occasions is mapped to one or more occasions of the second set of occasions. The operations of 1305 may be performed in accordance with examples as disclosed herein. In some examples, aspects of the operations of 1305 may be performed by a control information component 825 as described with reference to FIG. 8.

At 1310, the method may include monitoring for the first message during the first set of occasions using one or more resources allocated by the network entity in a first mode of operation. The operations of 1310 may be performed in accordance with examples as disclosed herein. In some examples, aspects of the operations of 1310 may be performed by a message transmission component 830 as described with reference to FIG. 8.

At 1315, the method may include transmitting a feedback message indicating a failure of the first message to be received during the first set of occasions. The operations of 1315 may be performed in accordance with examples as disclosed herein. In some examples, aspects of the operations of 1315 may be performed by a feedback message component 835 as described with reference to FIG. 8.

At 1320, the method may include monitoring for a retransmission of the first message on one or more occasions of the second set of occasions based on the feedback message and in accordance with the mapping between the first set of occasions and the second set of occasions. The operations of 1320 may be performed in accordance with examples as disclosed herein. In some examples, aspects of the operations of 1320 may be performed by a retransmission component 840 as described with reference to FIG. 8.

The following provides an overview of aspects of the present disclosure:

Aspect 1: A method for wireless communication at a UE, comprising: receiving, from a network entity, control information indicative of a first set of occasions for periodic transmissions in accordance with a first set of parameters and a second set of occasions for periodic transmissions in accordance with a second set of parameters, wherein a mapping between the first set of occasions and the second set of occasions indicates that an occasion of the first set of occasions is mapped to one or more occasions of the second set of occasions; transmitting a first message during the first set of occasions; receiving a feedback message indicating a failure of the first message to be received during the first set of occasions; and transmitting a retransmission of the first message on one or more occasions of the second set of occasions based at least in part on the feedback message and in accordance with the mapping between the first set of occasions and the second set of occasions.

Aspect 2: The method of aspect 1, wherein transmitting the first message comprises: transmitting the first message during the first set of occasions using one or more resources allocated by the network entity in a first mode of operation.

Aspect 3: The method of any of aspects 1 through 2, further comprising: receiving, from the network entity, an indication indicating whether a set of resources for the second set of occasions for periodic transmissions is associated with a first mode of operation or a second mode of operation.

Aspect 4: The method of aspect 3, wherein the set of resources represents a subband in an uplink communication or a resource pool in a sidelink communication.

Aspect 5: The method of any of aspects 1 through 4, further comprising: randomly accessing the second set of occasions to identify the one or more occasions of the second set of occasions for transmitting the retransmission of the first message based at least in part on determining that the set of resources for the second set of occasions is associated with the second mode of operation.

Aspect 6: The method of any of aspects 1 through 5, further comprising: receiving, from the network entity, an indication indicating whether a first set of resources for the first set of occasions for periodic transmissions is associated with a first mode of operation or a second mode of operation and whether a second set of resources for the second set of occasions for periodic transmissions is associated with the first mode of operation or the second mode of operation.

Aspect 7: The method of aspect 6, further comprising: transmitting the first message using the first set of resources in the first mode of operation in accordance with the indication; and transmitting the retransmission of the first using the second set of resources in the second mode of operation in accordance with the indication, wherein the first message and the retransmission of the first message are soft combined across the first set of resources and the second set of resources.

Aspect 8: The method of any of aspects 1 through 7, wherein the second set of occasions for periodic transmissions comprises a set of transmit occasions.

Aspect 9: The method of aspect 8, wherein the set of transmit occasions supports a transmission on one or more uplink resources or a transmission on one or more sidelink resources or both.

Aspect 10: The method of any of aspects 1 through 9, further comprising: transmitting, to a set of UEs, an indication of the second set of occasions for periodic transmissions in accordance with the second set of parameters.

Aspect 11: The method of aspect 10, wherein the indication comprises at least one of a sidelink control indication, an addition to a physical sidelink shared channel, a medium access control (MAC) control element, a radio resource control signal, or a combination thereof.

Aspect 12: The method of any of aspects 1 through 11, further comprising: receiving, from the network entity, a second control information modifying the second set of parameters, wherein the second set of parameters are modified based at least in part on at least one of a number of feedback messages over a set of occasions, a detection of beam blocking, a remaining packet delay budget, or a combination thereof.

Aspect 13: The method of any of aspects 1 through 12, further comprising: receiving, from the network entity, a second control information modifying a periodicity for the retransmission of the first message based at least in part on a remaining packet delay budget.

Aspect 14: The method of any of aspects 1 through 13, further comprising: transmitting, to the network entity, a channel state information report; and receiving, from the network entity, a second control information modifying the second set of parameters based at least in part on the channel state information report.

Aspect 15: The method of any of aspects 1 through 14, wherein the second set of occasions are included in one or more time-domain bundles according to a periodicity, and second set of parameters comprises at least one of a number of occasions per bundle of the one or more time-domain bundles, a time between one or more occasions within a bundle of the one or more time-domain bundles, a periodicity between two consecutive time-domain bundles, or a combination thereof.

Aspect 16: The method of any of aspects 1 through 15, wherein the control information comprises a downlink control information, a group-common downlink control information, or both.

Aspect 17: A method, for wireless communication at a UE, comprising: receiving, from a network entity, control information indicative of a first set of occasions for periodic transmissions in accordance with a first set of parameters and a second set of occasions for periodic transmissions in accordance with a second set of parameters, wherein a mapping between the first set of occasions and the second set of occasions indicates that an occasion of the first set of occasions is mapped to one or more occasions of the second set of occasions; monitoring for a first message during the first set of occasions; transmitting a feedback message indicating a failure of the first message to be received during the first set of occasions; and monitoring for a retransmission of the first message on one or more occasions of the second set of occasions based at least in part on the feedback message and in accordance with the mapping between the first set of occasions and the second set of occasions.

Aspect 18: The method of aspect 17, wherein monitoring for the first message comprises: monitoring for the first message during the first set of occasions using one or more resources allocated by the network entity in a first mode of operation.

Aspect 19: The method of any of aspects 17 through 18, further comprising: receiving, from the network entity, an indication indicating whether a set of resources for the second set of occasions for periodic transmissions is associated with a first mode of operation or a second mode of operation Aspect 20: The method of aspect 19, further comprising randomly accessing the second set of occasions to identify the one or more occasions of the second set of occasions for monitoring for the retransmission of the first message based at least in part on determining that the set of resources for the second set of occasions is associated with the second mode of operation.

Aspect 21: The method of any of aspects 19 through 20, wherein the set of resources represents a subband in an uplink communication or a resource pool in a sidelink communication.

Aspect 22: The method of any of aspects 17 through 21, further comprising: receiving, from the network entity, an indication indicating whether a first set of resources for the first set of occasions for periodic transmissions is associated with a first mode of operation or a second mode of operation and whether a second set of resources for the second set of occasions for periodic transmissions is associated with the first mode of operation or the second mode of operation.

Aspect 23: The method of aspect 22, further comprising: receiving the first message using the first set of resources in the first mode of operation in accordance with the indication; receiving the retransmission of the first using the second set of resources in the second mode of operation in accordance with the indication; and soft combining the first message and the retransmission of the first message across the first set of resources and the second set of resources.

Aspect 24: The method of any of aspects 17 through 23, wherein the second set of occasions for periodic transmissions comprises a set of receive occasions.

Aspect 25: The method of aspect 24, wherein the set of receive occasions supports a reception on one or more uplink resources or a reception on one or more sidelink resources or both.

Aspect 26: The method of any of aspects 17 through 25, further comprising: receiving, from the network entity, a second control information modifying the second set of parameters, wherein the second set of parameters are modified based at least in part on at least one of a number of feedback messages over a set of occasions or a detection of beam blocking, a remaining packet delay budget, or a combination thereof.

Aspect 27: The method of any of aspects 17 through 26, further comprising: receiving, from the network entity, a second control information modifying a periodicity for the retransmission of the first message based at least in part on a remaining packet delay budget.

Aspect 28: The method of any of aspects 17 through 27, further comprising: transmitting, to the network entity, a channel state information report; and receiving, from the network entity, a second control information modifying the second set of parameters based at least in part on the channel state information report.

Aspect 29: The method of any of aspects 17 through 28, wherein the second set of occasions are included in one or more time-domain bundles according to a periodicity, and second set of parameters comprises at least one of a number of occasions per bundle of the one or more time-domain bundles, a time between one or more occasions within a bundle of the one or more time-domain bundles, a periodicity between two consecutive time-domain bundles, or a combination thereof.

Aspect 30: The method of any of aspects 17 through 29, wherein the control information comprises a downlink control information, a group-common downlink control information, or both.

Aspect 31: An apparatus for wireless communication at a UE, comprising a processor; memory coupled with the processor; and instructions stored in the memory and executable by the processor to cause the apparatus to perform a method of any of aspects 1 through 16.

Aspect 32: An apparatus for wireless communication at a UE, comprising at least one means for performing a method of any of aspects 1 through 16.

Aspect 33: A non-transitory computer-readable medium storing code for wireless communication at a UE, the code comprising instructions executable by a processor to perform a method of any of aspects 1 through 16.

Aspect 34: An apparatus comprising a processor; memory coupled with the processor; and instructions stored in the memory and executable by the processor to cause the apparatus to perform a method of any of aspects 17 through 30.

Aspect 35: An apparatus comprising at least one means for performing a method of any of aspects 17 through 30.

Aspect 36: A non-transitory computer-readable medium storing code the code comprising instructions executable by a processor to perform a method of any of aspects 17 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, control information indicative of a first set of occasions for periodic transmissions in accordance with a first set of parameters and a second set of occasions for periodic transmissions in accordance with a second set of parameters, wherein a mapping between the first set of occasions and the second set of occasions indicates that an occasion of the first set of occasions is mapped to one or more occasions of the second set of occasions;
   transmitting a first message during the first set of occasions;
   receiving a feedback message indicating a failure of the first message to be received during the first set of occasions; and
   transmitting a retransmission of the first message on one or more occasions of the second set of occasions based at least in part on the feedback message and in accordance with the mapping between the first set of occasions and the second set of occasions.

2. The method of claim 1, wherein transmitting the first message comprises:
   transmitting the first message during the first set of occasions using one or more resources allocated by the network entity in a first mode of operation.

3. The method of claim 1, further comprising:
   receiving, from the network entity, an indication indicating whether a set of resources for the second set of occasions for periodic transmissions is associated with a first mode of operation or a second mode of operation.

4. The method of claim 3, further comprising:
   randomly accessing the second set of occasions to identify the one or more occasions of the second set of occasions for transmitting the retransmission of the first message based at least in part on determining that the set of resources for the second set of occasions is associated with the second mode of operation.

5. The method of claim 3, wherein the set of resources represents a subband in an uplink communication or a resource pool in a sidelink communication.

6. The method of claim 1, further comprising:
   receiving, from the network entity, an indication indicating whether a first set of resources for the first set of occasions for periodic transmissions is associated with a first mode of operation or a second mode of operation and whether a second set of resources for the second set of occasions for periodic transmissions is associated with the first mode of operation or the second mode of operation.

7. The method of claim 6, further comprising:
   transmitting the first message using the first set of resources in the first mode of operation in accordance with the indication; and
   transmitting the retransmission of the first using the second set of resources in the second mode of operation in accordance with the indication, wherein the first message and the retransmission of the first message are soft combined across the first set of resources and the second set of resources.

8. The method of claim 1, wherein the second set of occasions for periodic transmissions comprises a set of transmit occasions.

9. The method of claim 8, wherein the set of transmit occasions supports a transmission on one or more uplink resources or a transmission on one or more sidelink resources or both.

10. The method of claim 1, further comprising:
    transmitting, to a set of UEs, an indication of the second set of occasions for periodic transmissions in accordance with the second set of parameters.

11. The method of claim 10, wherein the indication comprises at least one of a sidelink control indication, an addition to a physical sidelink shared channel, a medium access control (MAC) control element, a radio resource control signal, or a combination thereof.

12. The method of claim 1, further comprising:
    receiving, from the network entity, a second control information modifying the second set of parameters, wherein the second set of parameters are modified based at least in part on at least one of a number of feedback messages over a set of occasions, a detection of beam blocking, a remaining packet delay budget, or a combination thereof.

13. The method of claim 1, further comprising:
    receiving, from the network entity, a second control information modifying a periodicity for the retransmission of the first message based at least in part on a remaining packet delay budget.

14. The method of claim 1, further comprising:
    transmitting, to the network entity, a channel state information report; and
    receiving, from the network entity, a second control information modifying the second set of parameters based at least in part on the channel state information report.

15. The method of claim 1, wherein:
the second set of occasions are included in one or more time-domain bundles according to a periodicity, and
second set of parameters comprises at least one of a number of occasions per bundle of the one or more time-domain bundles, a time between one or more occasions within a bundle of the one or more time-domain bundles, a periodicity between two consecutive time-domain bundles, or a combination thereof.

16. The method of claim 1, wherein the control information comprises a downlink control information, a group-common downlink control information, or both.

17. A method, for wireless communication at a user equipment (UE), comprising:
receiving, from a network entity, control information indicative of a first set of occasions for periodic transmissions in accordance with a first set of parameters and a second set of occasions for periodic transmissions in accordance with a second set of parameters, wherein a mapping between the first set of occasions and the second set of occasions indicates that an occasion of the first set of occasions is mapped to one or more occasions of the second set of occasions;
monitoring for a first message during the first set of occasions;
transmitting a feedback message indicating a failure of the first message to be received during the first set of occasions; and
monitoring for a retransmission of the first message on one or more occasions of the second set of occasions based at least in part on the feedback message and in accordance with the mapping between the first set of occasions and the second set of occasions.

18. The method of claim 17, wherein monitoring for the first message comprises:
monitoring for the first message during the first set of occasions using one or more resources allocated by the network entity in a first mode of operation.

19. The method of claim 17, further comprising:
receiving, from the network entity, an indication indicating whether a set of resources for the second set of occasions for periodic transmissions is associated with a first mode of operation or a second mode of operation.

20. The method of claim 19, further comprising:
randomly accessing the second set of occasions to identify the one or more occasions of the second set of occasions for monitoring for the retransmission of the first message based at least in part on determining that the set of resources for the second set of occasions is associated with the second mode of operation.

21. The method of claim 19, wherein the set of resources represents a subband in an uplink communication or a resource pool in a sidelink communication.

22. The method of claim 17, further comprising:
receiving, from the network entity, an indication indicating whether a first set of resources for the first set of occasions for periodic transmissions is associated with a first mode of operation or a second mode of operation and whether a second set of resources for the second set of occasions for periodic transmissions is associated with the first mode of operation or the second mode of operation.

23. The method of claim 22, further comprising:
receiving the first message using the first set of resources in the first mode of operation in accordance with the indication;
receiving the retransmission of the first using the second set of resources in the second mode of operation in accordance with the indication; and
soft combining the first message and the retransmission of the first message across the first set of resources and the second set of resources.

24. The method of claim 17, wherein the second set of occasions for periodic transmissions comprises a set of receive occasions.

25. The method of claim 24, wherein the set of receive occasions supports a reception on one or more uplink resources or a reception on one or more sidelink resources or both.

26. The method of claim 17, further comprising:
receiving, from the network entity, a second control information modifying the second set of parameters, wherein the second set of parameters are modified based at least in part on at least one of a number of feedback messages over a set of occasions or a detection of beam blocking, a remaining packet delay budget, or a combination thereof.

27. The method of claim 17, further comprising:
receiving, from the network entity, a second control information modifying a periodicity for the retransmission of the first message based at least in part on a remaining packet delay budget.

28. The method of claim 17, further comprising:
transmitting, to the network entity, a channel state information report; and
receiving, from the network entity, a second control information modifying the second set of parameters based at least in part on the channel state information report.

29. An apparatus for wireless communication at a user equipment (UE), comprising:
a processor;
memory coupled with the processor; and
instructions stored in the memory and executable by the processor to cause the apparatus to:
receive, from a network entity, control information indicative of a first set of occasions for periodic transmissions in accordance with a first set of parameters and a second set of occasions for periodic transmissions in accordance with a second set of parameters, wherein a mapping between the first set of occasions and the second set of occasions indicates that an occasion of the first set of occasions is mapped to one or more occasions of the second set of occasions;
transmit a first message during the first set of occasions;
receive a feedback message indicating a failure of the first message to be received during the first set of occasions; and
transmit a retransmission of the first message on one or more occasions of the second set of occasions based at least in part on the feedback message and in accordance with the mapping between the first set of occasions and the second set of occasions.

30. An apparatus for wireless communication at a user equipment (UE), comprising:
a processor;
memory coupled with the processor; and
instructions stored in the memory and executable by the processor to cause the apparatus to:
receive, from a network entity, control information indicative of a first set of occasions for periodic transmissions in accordance with a first set of parameters and a second set of occasions for periodic transmissions in accordance with a second set of parameters, wherein a mapping between the first set of occasions and the second set of occasions indicates that an occasion of the first set of occasions is mapped to one or more occasions of the second set of occasions;

monitor for a first message during the first set of occasions;

transmit a feedback message indicating a failure of the first message to be received during the first set of occasions; and monitor for a retransmission of the first message on one or more occasions of the second set of occasions based at least in part on the feedback message and in accordance with the mapping between the first set of occasions and the second set of occasions.

* * * * *